United States Patent [19]

Akagiri et al.

[11] Patent Number: 5,873,065
[45] Date of Patent: Feb. 16, 1999

[54] TWO-STAGE COMPRESSION AND EXPANSION OF COUPLING PROCESSED MULTI-CHANNEL SOUND SIGNALS FOR TRANSMISSION AND RECORDING

[75] Inventors: Kenzo Akagiri, Tokyo, Japan; Mark Franklin Davis, Pacifica, Calif.; Craig Campbell Todd, Mill Valley, Calif.; Ray Milton Dolby, San Francisco, Calif.

[73] Assignee: Sony Corporation, Tokyo, Japan

[21] Appl. No.: 446,689

[22] PCT Filed: Dec. 7, 1994

[86] PCT No.: PCT/US94/14267

§ 371 Date: Nov. 20, 1995

§ 102(e) Date: Nov. 20, 1995

[30] Foreign Application Priority Data

Dec. 7, 1993 [JP] Japan .................................. 5-306898

[51] Int. Cl.⁶ .............................. H04S 3/00; H04B 1/66; H04H 5/00
[52] U.S. Cl. .............................. 704/500; 381/2; 704/227; 704/229
[58] Field of Search .................................. 395/2.36, 2.38, 395/2.39; 381/2; 704/227, 229, 230, 500

[56] References Cited

U.S. PATENT DOCUMENTS

| | | | |
|---|---|---|---|
| 5,166,686 | 11/1992 | Sugiyama | 341/155 |
| 5,185,800 | 2/1993 | Mahieux | 704/500 |
| 5,241,603 | 8/1993 | Akagiri et al. | 704/205 |
| 5,285,498 | 2/1994 | Johnston | 381/2 |
| 5,341,457 | 8/1994 | Hall, II et al. | 704/226 |
| 5,471,558 | 11/1995 | Tsutsui | 704/219 |
| 5,481,614 | 1/1996 | Johnston | 381/2 |
| 5,490,170 | 2/1996 | Akagiri et al. | 375/240 |
| 5,491,773 | 2/1996 | Veldhuis et al. | 395/2.38 |
| 5,535,300 | 7/1996 | Hall, II et al. | 395/2.36 |
| 5,539,829 | 7/1996 | Lokhoff et al. | 381/2 |
| 5,664,056 | 9/1997 | Akagiri | 704/229 |
| 5,687,157 | 11/1997 | Imai et al. | 369/124 |

*Primary Examiner*—David R. Hudspeth
*Assistant Examiner*—Tálivaldis Ivars Šmits
*Attorney, Agent, or Firm*—Limbach & Limbach LLP

[57] ABSTRACT

A multi-channel signal compressor for compressing digital sound signals in the respective channels of a multi-channel sound system. The apparatus comprises a first-stage compression system and a second-stage compression system. In the first-stage compression system, a coupling circuit performs coupling between the digital sound signals of at least two of the channels to generate coupling-processed signals, one for each of the channels. A compressor circuit receives the coupling-processed signals from the coupling circuit and frequency divides each coupling-processed signal into frequency range signals in respective frequency ranges, and compresses the frequency range signals obtained by dividing each coupling-processed signal to generate a first-stage compressed signal. In the second-stage compression system, a determining circuit receives the first-stage compressed signal for each channel from the first-stage compression system and determines an energy for each channel from the first-stage compressed signal of the respective channel. A channel bit apportionment decision circuit operates in response to the determining circuit, and apportions a predetermined number of bits among the channels to apportion a number of bits to each channel. Finally, an additional compressor additionally compresses the first-stage compressed signal of each channel using, for each channel, the number of bits apportioned to the respective channel by the channel bit apportionment decision circuit.

16 Claims, 10 Drawing Sheets

TWO-STAGE COMPRESSION AND EXPANSION OF COUPLING PROCESSED MULTI-CHANNEL SOUND SIGNALS FOR TRANSMISSION AND RECORDING

FIELD OF THE INVENTION

This invention relates to a method and apparatus for compressing the sound signals of the multi-channel sound system of, for example, a motion picture theater, a video tape recorder, or a video disc player, a method for transmitting the compressed sound signals of a multi-channel sound system, a method and apparatus for expanding the compressed sound signals of a multi-channel sound system, and a recording medium on which the compressed sound signals of a multi-channel sound system are recorded.

BACKGROUND OF THE INVENTION

Many techniques for compressing digital audio or speech signals are known. For example, in sub-band coding, a non block-forming frequency band dividing system, in which the input audio signal is not divided in time into blocks, but is divided in frequency by a filter into plural frequency bands for quantizing. In a block-forming frequency band dividing system, such as a transform coding system, the input audio signal in the time domain is converted into spectral coefficients in the frequency domain by an orthogonal transform. The resulting spectral coefficients are divided by frequency into plural frequency bands, and the spectral coefficients in each band are quantized.

A technique consisting of a combination of sub-band coding and transform coding is also known. In this, frequency range signals produced by dividing the input audio signal in frequency without dividing it into blocks are individually orthogonally transformed into spectral coefficients. The spectral coefficients are then divided by frequency into plural frequency bands, and the spectral coefficients in each band are then quantized.

Among the filters useful for dividing a digital audio input signal into frequency ranges without dividing it into blocks is the quadrature mirror (QMF) filter, which is described, for example, in R. E. Crochiere, *Digital Coding of Speech in Sub-bands*, 55 BELL SYST. TECH. J. No.8, (1976). A technique of dividing the audio input signal in frequency into frequency bands of an equal width is discussed in Joseph H. Rothweiler, *Polyphase Quadrature Filers-a New Sub-band Coding Technique,* ICASSP 83, BOSTON (1983).

Known techniques for orthogonally transforming an input signal include the technique of dividing the digital input audio signal in time into blocks having a predetermined duration, and processing the resulting blocks using a fast Fourier transform (FFT), a discrete cosine transform (DCT), or a modified DCT (MDCT) to convert each block of the digital audio signal in the time domain into a set of spectral coefficients in the frequency domain. A modified DCT is discussed in J. P. Princen and A. B. Bradley, *Subband/Transform Coding Using Filter Bank Based on Time Domain Aliasing Cancellation,* ICASSP 1987.

As a technique for quantizing the spectral coefficients obtained by frequency division, it is known to divide the spectral coefficients by frequency into bands to take account of the frequency resolution characteristics of the human sense of hearing. The audio frequency range of 0 Hz to 20 or 22 kHz may be divided in frequency into bands, such as 25 critical bands, which have a bandwidth that increases with increasing frequency. The spectral coefficients in each of the bands are quantized by adaptive bit allocation applied to each band. For example, the spectral coefficients resulting from a modified discrete cosine transform (MDCT) are divided by frequency into bands, and the spectral coefficients in each band are quantized using an adaptively-determined number of bits.

Two known adaptive bit allocation techniques will be now be described. First, in the technique described in ASSP-25, IEEE TRANSACTIONS OF ACOUSTICS, SPEECH, AND SIGNAL PROCESSING, No.4, August 1977, bit allocation is carried out on the basis of the magnitude of the signals of the respective bands. Although this system provides a flat quantizing noise spectrum, and minimizes noise energy, noise perceived by the listener is not minimized because this technique does not exploit the masking characteristics of the human sense of hearing.

On the other hand, the technique described in M. A. Kransner, *The Critical Band Coder-Digital Encoding of the Perceptual Requirements of the Auditory System,* ICASSP 1980, uses the masking characteristics of the human sense of hearing to determine the signal-to-noise ratio necessary for each band to make a fixed quantizing bit allocation. However, this technique provides relatively poor results with a single sine-wave input because of its fixed bit allocation.

As a high-efficiency system for compressing digital audio signals, employing, for example, the above-mentioned sub-band coding system, a high-efficiency compression system called ATRAC is already used in practical applications. This system compresses digital audio signals to about 20% of their original bit requirement by taking advantage of the characteristics of the human sense of hearing using adaptive transform acoustic coding. ATRAC is a registered trademark of one of the present assignees (Sony Corporation).

Multi-channel audio or speech signals in four to eight channels are not only encountered in, for example, commonplace audio equipment, but are also encountered in stereo or multi-channel sound systems, such as those found in motion picture theaters, high-quality television systems, video tape recorders, and video disc players. In such cases, the use of high-efficiency compression is desirable to reduce the bit rate required to represent the large number of audio signals.

In particular, in commercial applications, a tendency towards multi-channel digital sound signals and equipment handling eight-channel digital sound signals has developed. Typical of the equipment handling eight-channel digital sound signals are motion picture theater sound systems, and the apparatus that electronically reproduces the pictures and sound of a motion picture film via various electronic media, in particular apparatus such as high-quality television systems, video tape recorders, and video disc players. In the sound systems of such apparatus, the tendency is towards multi-channel sound systems of between four and eight channels.

Motion picture theater sound systems have recently been proposed that record on a motion picture film the digital sound signals for the following eight channels: left, left-center, center, right-center, right, left surround, right surround, and sub-woofer. These sound channels are respectively reproduced by left loudspeaker, a left-center loudspeaker, a center loudspeaker, a right-center loudspeaker, and a right loudspeaker, all arranged behind the screen; a sub-woofer located behind or in front of the screen; and a left-surround loudspeaker and a right-surround loudspeaker. For the left-surround speaker and the right-surround speaker, two groups of loudspeakers are respectively arranged on the left side wall and the left part of the back wall of the auditorium, and on the right side wall and the right part of the back wall of the auditorium. The two groups of loudspeakers on the sides and back of the auditorium generate a sound field rich in ambience to accompany spectacular optical effects on the large-format screen of the motion picture theater. For simplicity, these two groups of loudspeakers will from now on be referred to as the "left-surround loudspeaker" and the "right-surround loudspeaker."

It is difficult to record on a motion picture film eight channels of 16-bit linear-quantized digital audio with the sampling frequency of 44.1 kHz, such as is employed in a compact disc (CD), because the film lacks an area capable of accommodating a soundtrack wide enough for such a signal. The width of the motion picture film and the width of the picture area on the film are standardized. The width of the film cannot be increased, or the width of the picture area cannot be decreased to accommodate a soundtrack of the width required for digital audio signals of this type. A standard-width film, with a standard picture area, a standard analog sound track, and standard perforations, has only a narrow area in which digital audio signals can be recorded. Accordingly, eight channels of digital sound can only be recorded if the digital sound signals are compressed prior to recording on the film. The eight channels of digital sound may be compressed using the above-mentioned ATRAC high-efficiency compression system.

Motion picture films are susceptible to scratches, which can cause drop-outs if digital sound signals are recorded without any form of error detection and correction. Therefore, the use of error correction codes is essential, and this must be taken into account when the signal compression is performed.

Optical discs have become popular as a medium for providing motion pictures in the home. It is desirable to be able to record multi-channel sound with four to eight channels on an optical disc to provide more realistic sound than conventional stereo sound. On an optical disc, the data volume of the video signal is as many as ten times that of the sound signal, and only a limited recording area is provided for the sound signal. Especially when the picture signal is required to provide a high picture quality, as is required with the current trend towards larger-size screens, as much of the recording area as possible is devoted to the picture signal. Thus, the sound signal must be subject to a high degree of compression if the desired number of channels is to be provided in the recording area available for the sound signal.

When the above-mentioned ATRAC high-efficiency compression system proposed by one of the present assignees (Sony Corporation) is used in a stereo (two-channel) audio system, the audio signal in each channel is compressed independently of the other. This enables each channel to be used independently, and simplifies the processing algorithm used to compress the audio signals. Operated this way, the ATRAC system provides sufficient compression for most applications, and the sound quality obtained when an audio signal is compressed and expanded using the ATRAC system is well regarded.

However, because it compresses each audio signal independently, it cannot be said that the bit allocation process by which the present ATRAC system performs its compression operates at highest efficiency. For example, if the signal level in one of the channels is very low, the signal can be represented adequately using a small number of bits. On the other hand, the signal in another channel may require a much larger number of bits to represent it adequately. Yet the present ATRAC system allocates the same number of bits to each channel, irrespective of the number of bits actually required to adequately represent the signal in the channel. Thus, to provide its high quality of reproduction, there must be some redundancy in the bit allocation performed by the present system.

SUMMARY OF THE INVENTION

If a multi-channel sound signal is to be recorded on a motion picture film or on an optical disc, it is necessary to increase the compression ratio with a minimum deterioration in the sound quality.

It is therefore an object of the present invention to provide an encoding method and apparatus for further improving the compression ratio to enable multi-channel sound signals to be recorded on a motion picture film, an optical disc, and other media, or to be transmitted or distributed.

It is another object of the present invention to provide an encoding method and apparatus for encoding sound signals of at least two channels with an extremely small degree of deterioration in sound quality, with excellent channel separation, and with stable stereo imaging.

The invention first provides a multi-channel signal compressor for compressing digital sound signals in the respective channels of a multi-channel sound system. The apparatus comprises a first-stage compression system and a second-stage compression system. In the first-stage compression system, a coupling circuit performs coupling between the digital sound signals of at least two of the channels to generate coupling-processed signals, one for each of the channels. A compressor circuit receives the coupling-processed signals from the coupling circuit and frequency divides each coupling-processed signal into frequency range signals in respective frequency ranges, and compresses the frequency range signals obtained by dividing each coupling-processed signal to generate a first-stage compressed signal. In the second-stage compression system, a determining circuit receives the first-stage compressed signal for each channel from the first-stage compression system and determines an energy for each channel from the first-stage compressed signal of the respective channel. A channel bit apportionment decision circuit operates in response to the determining circuit, and apportions a predetermined number of bits among the channels. Finally, an additional compressor additionally compresses the first-stage compressed signal of each channel using, for each channel, the number of bits apportioned to the respective channel by the channel bit apportionment decision circuit.

The invention next provides a method for compressing digital sound signals in the respective channels of a multi-channel sound system. In the method, coupling is performed between the digital sound signals in at least two of the channels to generate coupling-processed signals, one for each channel. The coupling-processed signals are frequency divided into frequency range signals in respective frequency ranges. The frequency range signals obtained by dividing each coupling-processed signal are compressed to generate a first-stage compressed signal. An energy for each channel is determined from the first-stage compressed signal for the respective channel. A predetermined number of bits are apportioned among the channels in response to the determined energy for each channel to apportion a number of bits to each channel. Finally, the first-stage compressed signal for each channel is additionally compressed using, for the channel, the number of bits apportioned to the channel.

The invention also provides a recording medium on which there is recorded a compressed signal generated by the above method for compressing digital sound signals in the respective channels of a multi-channel sound system.

The invention also provides a method of transmitting digital sound signals in respective channels of a multi-channel sound system via a transmission medium in which the first-stage compressed signal for each channel in the method described above is additionally compressed to generate a respective second-stage compressed signal, the second-stage compressed signals of all the channels are multiplexed to provide a bit stream, and the bit stream is applied to a transmission medium.

The invention next provides a multi-channel signal expander for expanding a compressed signal representing the digital sound signals in the respective channels of a multi-channel sound system in which the digital sound signals in at least two of the channels have been subject to coupling prior to compression. The compressed signal includes main information and subsidiary information representing the digital sound signals of the at least two of the channels. The apparatus comprises a demultiplexer, a second stage expander and a first stage expander. The demultiplexer demultiplexes the compressed signal to extract the main information and the subsidiary information. The second-stage expander expands the main information from the demultiplexer by converting variable-length codes to fixed-length codes. The first-stage expander operates in response to the subsidiary information from the demultiplexer to additionally expand the fixed-length codes from the second-stage expander to provide a reconstructed digital sound signal in each of the at least two channels. The fixed-length codes on which the first-stage expander operates in one of the channels represent a narrower bandwidth signal than the fixed-length codes on which the first-stage expander operates in another of the channels, even though the digital sound signals in both of the channels have nominally the same bandwidth.

The invention also provides a method for expanding a compressed signal representing the digital sound signals in the respective channels of a multi-channel sound system in which the digital sound signals in at least two of the channels have been subject to coupling prior to compression. The compressed signal includes main information and subsidiary information representing the digital sound signals of the at least two channels. In the method, the compressed signal is multiplexed to extract the main information and the subsidiary information. The main information extracted from the compressed signal is expanded by converting the variable-length codes of the main information to fixed-length codes. Finally, the subsidiary information extracted from the compressed signal is used to further expand the fixed-length codes obtained by converting the variable-length codes of the main information to generate a reconstructed digital sound signal in each of the at least two channels. The fixed-length codes that are further expanded in one of the at least two channels represent a signal having a narrower bandwidth than the fixed-length codes that are further expanded in another of the at least two channels, even though the digital sound signals in both of the channels have nominally the same bandwidth.

Finally, the invention provides a multi-channel signal compressor for compressing digital sound signals in the respective channels of a multi-channel sound system. The apparatus comprises a first-stage compressor and a second-stage compressor. The first-stage compressor receives the digital sound signals of the respective channels and compresses the digital sound signals to provide respective first-stage compressed signals. The second-stage compressor receives the first-stage compressed signals from the first-stage compressor, determines an energy for each channel from the respective first-stage compressed signal, apportions bits among the channels in response to the energy determined for each channel to apportion a number of bits to each channel, and additionally compresses the first-stage compressed signals to provide respective second-stage compressed signals. The second-stage compressed signal in each channels uses the number of bits apportioned to the channel.

DETAILED DESCRIPTION OF THE INVENTION

Figure 1:
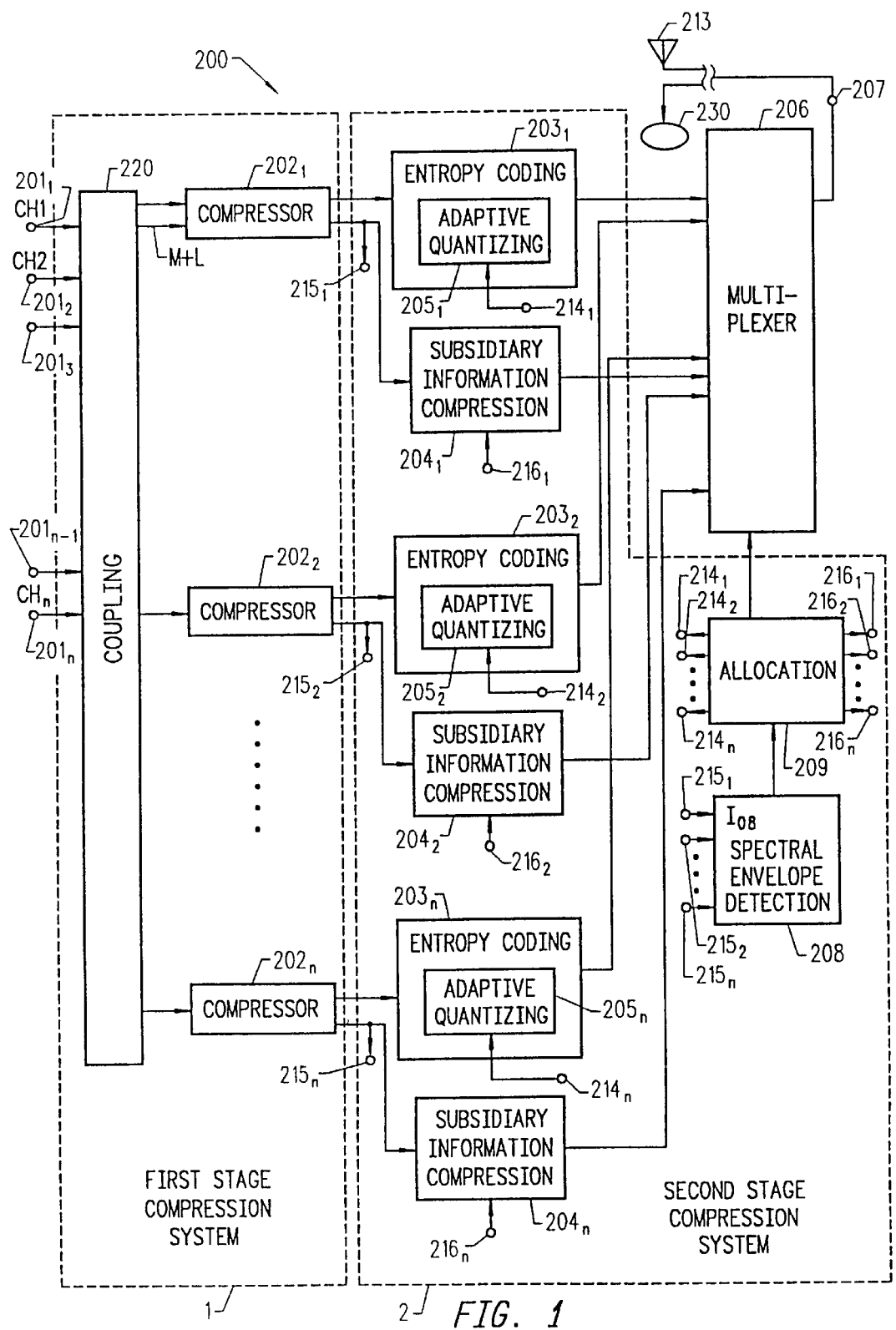
FIG. 1 is a block diagram showing the construction of multi-channel compressor apparatus according to the invention for compressing multi-channel sound signals.

Referring to the drawings, preferred embodiments of the present invention will now be described in detail.

FIG. 1 shows the essential portions of the multi-channel signal compressor apparatus according to the invention for compressing the digital sound signals of a multi-channel sound system. The multi-channel compressor apparatus is designed to compress the digital sound signals in the channels $CH_1$ to $CH_n$ to generate an output bit steam. In the apparatus, the first-stage compression system 1 includes the compressors $202_1$ to $202_n$ that respectively compress the digital input sound signals in the channels $CH_1$ to $CH_n$. The second-stage compression system 2 includes the log spectral envelope detector 208, the channel bit allocation decision circuit 209, the entropy encoders $203_1$ to $203_n$, and the subsidiary information compressors $204_1$ to $204_n$.

The log spectral envelope detector circuit 208 receives the subsidiary information generated by the first-stage compression system 1, and from the subsidiary information detects the signal energy in each of the channels $CH_1$ to $CH_n$. The channel bit allocation decision circuit 209 determines the allocation of the total number of bits corresponding to the output bit rate among the channels according to a ratio that substantially corresponds to the output of the log spectrum envelope detector 208. In the entropy encoders $203_1$ to $203_n$, the adaptive quantizers $205_1$ to $205_n$ respectively adaptively quantize the compressed signals from the first-stage compression system 1 using the number of bits indicated by the channel bit allocation information received from the channel bit allocation decision circuit 209. The entropy encoders convert the fixed-length words generated by the compressors in the first-stage compression system 1 into variable-length words. The subsidiary information compressors $204_1$ to $204_n$ adaptively compress the subsidiary information, i.e., the word-length information and scale factor information generated by the compressors $202_1$ to $202_n$ in the first-stage compression system 1 in the course of compressing the respective digital sound signals.

The bit stream resulting from compressing the digital sound signals in the respective channels by the multi-channel signal compressor according to the invention is recorded on a recording medium, or is transmitted via a transmission medium. Examples of the recording medium include a motion picture film; disc-shaped recording media, such as an optical disc, a magneto-optical disc, a phase-change type optical disc, and a magnetic disc; tape-shaped recording media, such as a video cassette; and solid-state media, such as a semiconductor memory and an IC card.

Figure 2:
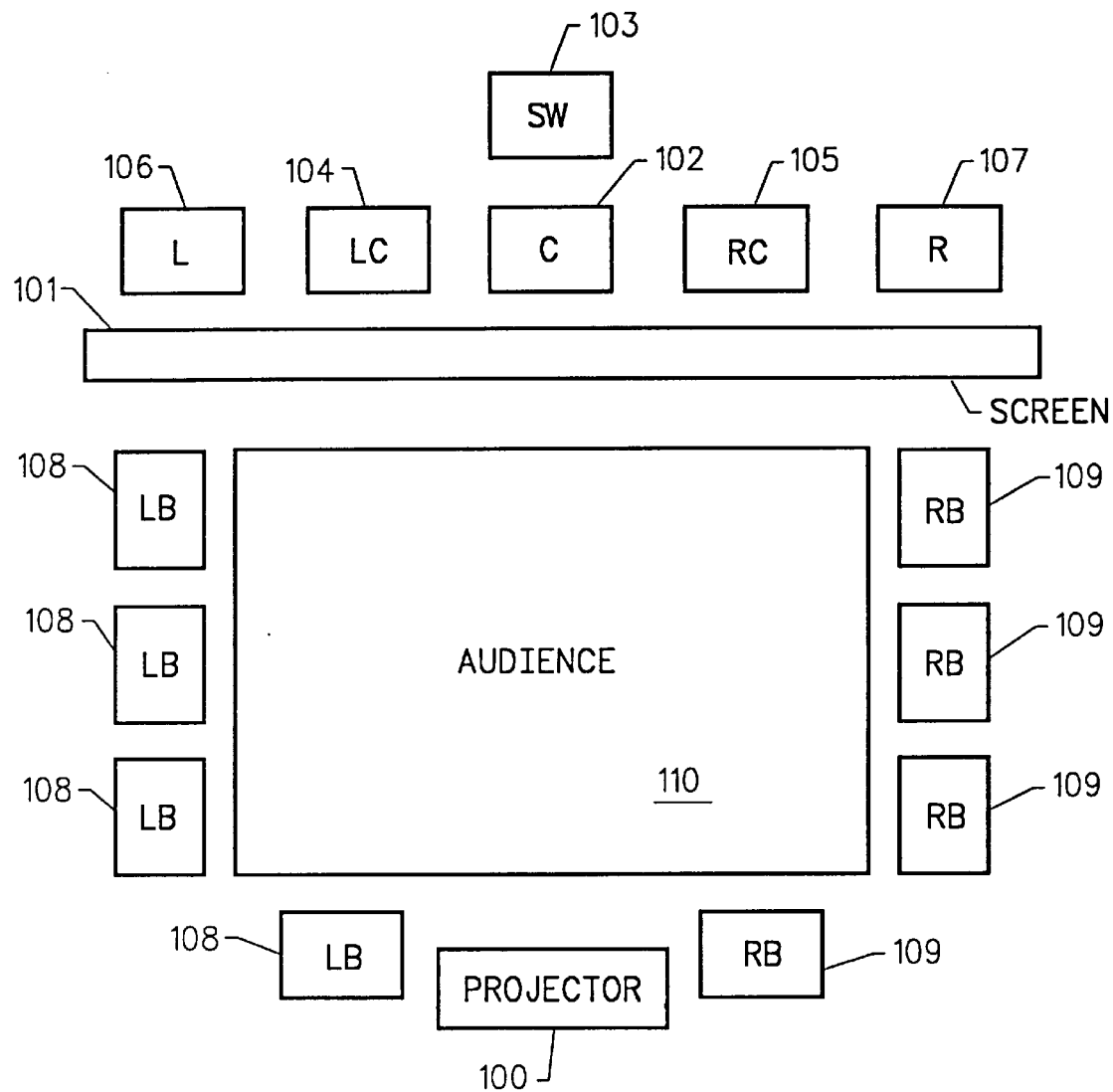
FIG. 2 illustrates the loudspeaker arrangement of an eight-channel digital sound system for use with motion pictures.

When the recording medium is a motion picture film, the sound signals in the channels $CH_1$ to $CH_8$ are for feeding to the respective loudspeakers of the digital motion picture sound system shown, for example, in FIG. 2. The signals of the center channel C, the sub-woofer channel SW, the left channel L, the left-center channel LC, the right channel R, the right-center channel RC, the left-surround channel LB, and the right-surround channel RB are respectively fed to the center loudspeaker 102, the sub-woofer 103, the left loudspeaker 106, the left-center loudspeaker 104, the right loudspeaker 107, the right-center loudspeaker 105, the left-surround loudspeaker 108, and the right-surround loudspeaker 109.

FIG. 2 shows the projector 100 that projects the picture in the picture area of the motion picture film onto the screen 101, and shows the placement of the various loudspeakers relative to the projector, the screen, and the audience 110.

The center loudspeaker 102 is located at the center of the screen 101 on the side of the screen remote from the audience 110 and generates the center channel sound in response to the center channel sound signal. It generates centrally-located sounds, and it is conventional that all dialog is reproduced by the center loudspeaker, irrespective of the position on the screen of the actor or actress speaking.

The sub-woofer 103 generates low-frequency effect sounds in response to the sub-woofer channel sound signal. It generates sounds which are often perceived as vibration, rather than as low-frequency sound, such as the sound of explosions and other large-scale special effects.

The left loudspeaker 106 and the right loudspeaker 107 are respectively arranged at or beyond the left and right extremities of the screen 101 and generate the left channel sound and the right channel sound in response to the left and right channel sound signals. They are primarily used for reproducing stereophonic music and sound effects emanating from sources located towards the left and right extremities of the screen.

The left-center loudspeaker 104 and the right-center loudspeaker 105 are respectively located between the center loudspeaker 102 and the left loudspeaker 106, and between the center loudspeaker 102 and the right loudspeaker 107. They respectively generate the left-center sound and the right-center sound in response to the left-center channel sound signal and the right-center channel sound signal. The loudspeakers 104 and 105 are used as auxiliary speakers for the left loudspeaker 106 and the right loudspeaker 107, respectively. In motion picture theaters having a large-size screen 101 and capable of holding a large audience, the perceived positions of sound sources located between the center speaker 102 and the left and right speakers 106 and 107 may be unstable or indistinct. Adding the left-center loudspeaker 104 and the right-center loudspeaker 105 helps locate such sound sources more stably, and therefore helps create a more realistic sound image.

The left surround loudspeaker 108 and the right surround loudspeaker 109 are normally hung on the walls of the auditorium surrounding the audience, and respectively generate the left-surround sound and the right-surround sound in response to the left-surround channel sound signal and the right-surround channel sound signal. These loudspeakers help give the audience the impression of being wrapped in a sound field, such as the sound of applause or celebration, and help create a three-dimensional sound image.

Returning to FIG. 1, the construction of the multi-channel signal compressor 200 will now be described. In FIG. 1, the digital sound signals in the channels $CH_1$ to $CH_n$ are fed to the input terminals $201_1$ to $201_n$ respectively, whence they pass to the coupling circuit 220. The coupling circuit reduces the number of bits required to represent the sound signals of a multi-channel sound system. Its operation will be described in detail below.

The digital sound signals in the channels $CH_1$ to $CH_n$, after processing by the coupling circuit 202, are supplied to the respective compressors $202_1$ to $202_n$, in the first-stage compression system 1. The compressors $202_1$ to $202_n$ compress the digital sound signals to generate main information and subsidiary information, both of which are expressed as fixed-length words. The construction of the compressors $202_1$ to $202_n$ will be described in detail below.

The main information from the compressors $202_1$ to $202_n$ is respectively supplied to the entropy encoders $203_1$ to $203_n$, which apply additional compression to convert the fixed-length words of the main information into variable-length code. The subsidiary information from the compressors $202_1$ to $202_n$, which includes the word lengths and the scaling factors relating to the compression performed in the first-stage compression system 1, as will be described in more detail below, is fed to the subsidiary information compressors $204_1$ to $204_n$. The subsidiary information compressors compress the subsidiary information in response to the channel bit allocation information for each channel supplied by the channel bit allocation decision circuit 209.

The entropy encoders $203_1$ to $203_n$ apply entropy encoding to the main information by converting fixed-length words of the main information into variable-length codes on the basis of the frequency of occurrence of the different possible words of the main information. Words that occur more frequently are allocated shorter variable-length codes, whereas less frequently-occurring words are allocated longer variable-length codes. The entropy encoders $203_1$ to $203_n$, respectively include the adaptive quantizing circuits $205_1$ to $205_n$, which perform adaptive quantizing.

The subsidiary information of the channels $CH_1$ to $CH_n$ is also fed from the first-stage compressors $202_1$ to $202_n$ via the terminals $215_1$ to $215_n$ to the log spectral envelope detection circuit 208. The log spectral envelope detection circuit 208 calculates the energy of the sound signal in each channel from the subsidiary information of the channel using, for example, the scaling factors of the different bands in the channel. From the scaling factors of the different bands, the spectral envelope of each channel is determined. From this, the log spectral envelope information for each channel is derived and is supplied to the channel bit allocation decision circuit 209.

The channel bit allocation decision circuit 209 operates in response to the log spectral envelope information of the channels received from the log spectral envelope detection circuit 208 to determine the allocation among the channels of the total number of bits corresponding to the output bit rate. Separate bit allocations are made for the main information of each channel and for the subsidiary information of each channel.

In the present embodiment, the compressors in the first-stage compression system 1 compress the digital sound signal in each channel to provide the main information and the subsidiary information with a bit-rate of about 100 kbps. The required output bit rate is 500 kbps for all eight channels, so further compression of the main information and the subsidiary information is required. Consequently, the channel bit allocation decision circuit 209 allocates the number of bits corresponding to the output bit rate among the eight channels according to the need of the sound signal in each channel for bits. In other words, the channel bit allocation decision circuit 209 allocates from the number of bits corresponding to the output bit rate of 500 kbps the number of bits used by each of the adaptive quantizers $205_1$ to $205_n$ when the respective entropy coder $203_1$ to $203_n$ converts the main information from the first-stage compression system 1 from a fixed word length to a variable word length.

As a result of this bit allocation process, the number of bits corresponding to a bit-rate of 100 kbps used by one of the compressors $202_1$ to $202_n$ in a channel in which the signal level is low is reduced to, for example, the number of bits corresponding to a bit rate of 10 kbps. In view of the restricted frequency range of the sub-woofer signal channel, the number of bits corresponding to a bit rate of 100 kbps used by the compressor to the sub-woofer channel is reduced to, for example, the number of bits corresponding to a bit rate of 20 kbps. As a result of this dynamic re-allocation of the bits among the channels, redundant bits that were allocated to some of the channels are removed to reduce the output bit rate to the required value (500 kbps) and, when the bit demand permits, to redeploy redundant bits to channels in which they can be more effectively employed.

The allocation of the bits corresponding to the output bit rate among the channels gives rise to significant differences in the numbers of bits used by the respective channels. However, because variable-length words are used, and because of the way in which the compressed signals from the second-stage compression system 2 are sequenced by the multiplexer 206, the differences in the number of bits used by the respective channels do not cause operational problems. Moreover, the differences in the number of bits used by the respective channels do not prevent simultaneous compression and expansion from being performed because the expander performs inverse operations to those performed by the compressor. In other words, at any time and in any channel, the expander demands no more or no fewer bits than the number of bits supplied by the compressor.

Information indicating the allocation of bits for quantizing the main information of each of the channels is fed from the channel bit allocation decision circuit 209 via the terminals $216_1$ to $216_n$ to the adaptive quantizing circuits $205_1$ to $205_n$ respectively. Information indicating the allocation of bits for quantizing the subsidiary information of each of the channels is fed from the channel bit allocation decision circuit 209 via the terminals $214_1$ to $214_n$ to the subsidiary information compressors $204_1$ to $204_n$.

In the adaptive quantizing circuits $205_1$ to $205_n$, the main information of each channel is adaptively quantized using, for each channel, the number of bits denoted by the information from the channel bit allocation decision circuit 209 indicating the bit allocation for the main information of the channel. The subsidiary information compressors $204_1$ to $204_n$ compress the subsidiary information (i.e., the scale factors and the word-length information) from the first-stage compressors $202_1$ to $202_n$ using, for each channel, the number of bits denoted by the information from the channel bit allocation decision circuit 209 indicating the bit allocation for the subsidiary information of the channel.

The outputs of the entropy encoders $203_1$ to $203_n$ and of the subsidiary information compressors $204_1$ to $204_n$ are fed to the multiplexer 206.

The multiplexer 206 multiplexes the outputs of the entropy encoders $203_1$ to $203_n$ and the subsidiary information compressors $204_1$ to $204_n$ supplied thereto and feeds the resulting output bit stream to the output terminal 207. The output bit stream from the output terminal is further processed by an error correction circuit (not shown), which adds error correction codes, and/or a modulator to form a bit-stream for recording on the recording medium. For example, the optical disc 230 or a motion picture film (not shown) may be employed as the recording medium. Alternatively, the bitstream may be broadcast via the antenna 231. The bitstream may be broadcast or distributed via other suitable media, such as satellite broadcasting, cable, copper wire or optical fibre distribution systems, ISDN systems, etc.

The processing performed by the above-mentioned coupling circuit 220 will now be described with reference to FIG. 3.

Figure 3:
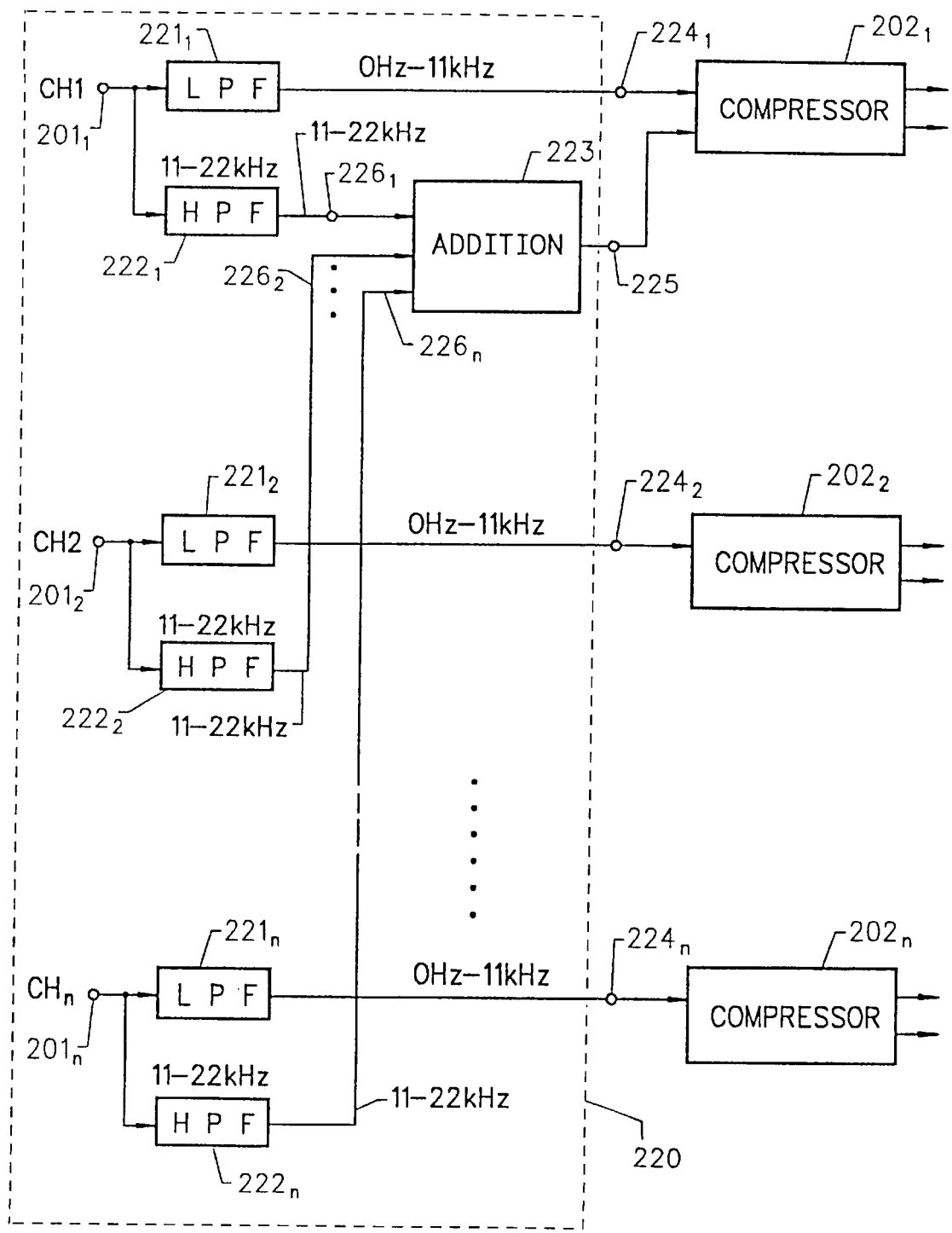
FIG. 3 is a block diagram showing the construction of the coupling circuit and first stage compressors constituting the apparatus shown in FIG. 1.

FIG. 3 shows the construction of the coupling circuit 220 that performs coupling between all the channels. In FIG. 3, the digital sound signal in each of the channels $CH_1$ to $CH_n$ is separated by the respective low-pass filters $221_1$ to $221_n$ and high-pass filters $222_1$ to $222_n$ into a lower frequency range signal and a high frequency range signal. The lower frequency range signal and high frequency range signal in each channel have frequency ranges of 0 Hz to 11 kHz and 11 to 22 kHz, respectively. The functions of the low-pass filters $221_1$ to $221_n$ and high-pass filters $222_1$ to $222_n$ may be provided by suitable quadrature mirror filters (QMFs), for example.

The low-frequency range signals in the frequency range of 0 Hz to 11 kHz from the low-pass filters $221_1$ to $221_n$ are respectively supplied via the terminals $224_1$ to $224_n$ to the first-stage compressors $202_1$ to $202_n$. On the other hand, the high-frequency range signals in the frequency range of 11 kHz to 22 kHz from the high-pass filters $222_1$ to $222_n$ are supplied via the terminals $226_1$ to $226_n$ to the addition circuit 223. The addition circuit sums the high frequency range signals for all the channels together to generate a single combined high-frequency range signal, which it supplies via the terminal 225 to the first-stage compressor circuit $202_1$.

The high-frequency range signals of the respective channels can be summed together to form a single combine high-frequency range signal, which is processed together with the lower frequency range signal of only one of the channels, because the human sense of hearing is known to have a poor perception of direction at high frequencies. Thus, it is difficult for a listener to discern which one of plural loudspeakers is generating a high-frequency sound. This becomes more difficult the higher the frequency of the sound. Our experiments indicate that the human sense of hearing has scarcely any ability to perceive the direction of sounds having frequencies above about 3 kHz.

Consequently, if a sound system has at least two channels, and the high-frequency range signals of all the channels are reproduced from the loudspeaker of one of the channels, it is difficult for the human listener to perceive which of the loudspeakers is generating the sound. Hence, summing the high frequency range signals of all the channels to generate a combined high frequency range signal, and reproducing the combined high frequency range signal using at least one of the loudspeakers of the sound system causes no noticeable degradation of the directional characteristics of the sound system.

Thus, summing the high-frequency range signals of the channels of the multi-channel sound system in the coupling circuit 202 and processing the resulting combined high-frequency range signal as the high-frequency range signal of a single channel, makes it unnecessary to include the high frequency range signals of the individual channels in the output bitstream. This enables the bits that would be required to represent the high frequency range signals of the individual channels to be omitted from the output bit stream, with a consequent saving in the number of bits required to represent the sound signals of the multi-channel sound system.

In the above-described embodiments, the lower frequency range signals are signal components in the frequency range from 0 Hz to 11 kHz, while the high frequency range signals are signal components in the frequency range of 11 to 22 kHz. However, because of the lack of directional perception above reasonably 3 kHz, the low-frequency range signals may alternatively be signal components in the frequency range of 0 Hz to 3 kHz, and the high-frequency range signals may be signal components in the frequency range of 3 to 22 kHz.

In the above embodiment, the high frequency range signals of all the channels are summed together to form the combined high frequency range signal, which is compressed as the high frequency range signal of only one channel. However, if the available bit rate allows it, the high frequency range signals of the left-hand channels, for example, may be summed together separately from the high-frequency range signals of the right-hand channels to provide two combined high frequency range signals, which are compressed as the high-frequency range signal of two channels. Alternatively, the high-frequency range signals of the front channels may be summed together separately from the high-frequency range signals of the surround channels to provide two combined high-frequency range signals.

Figure 4:
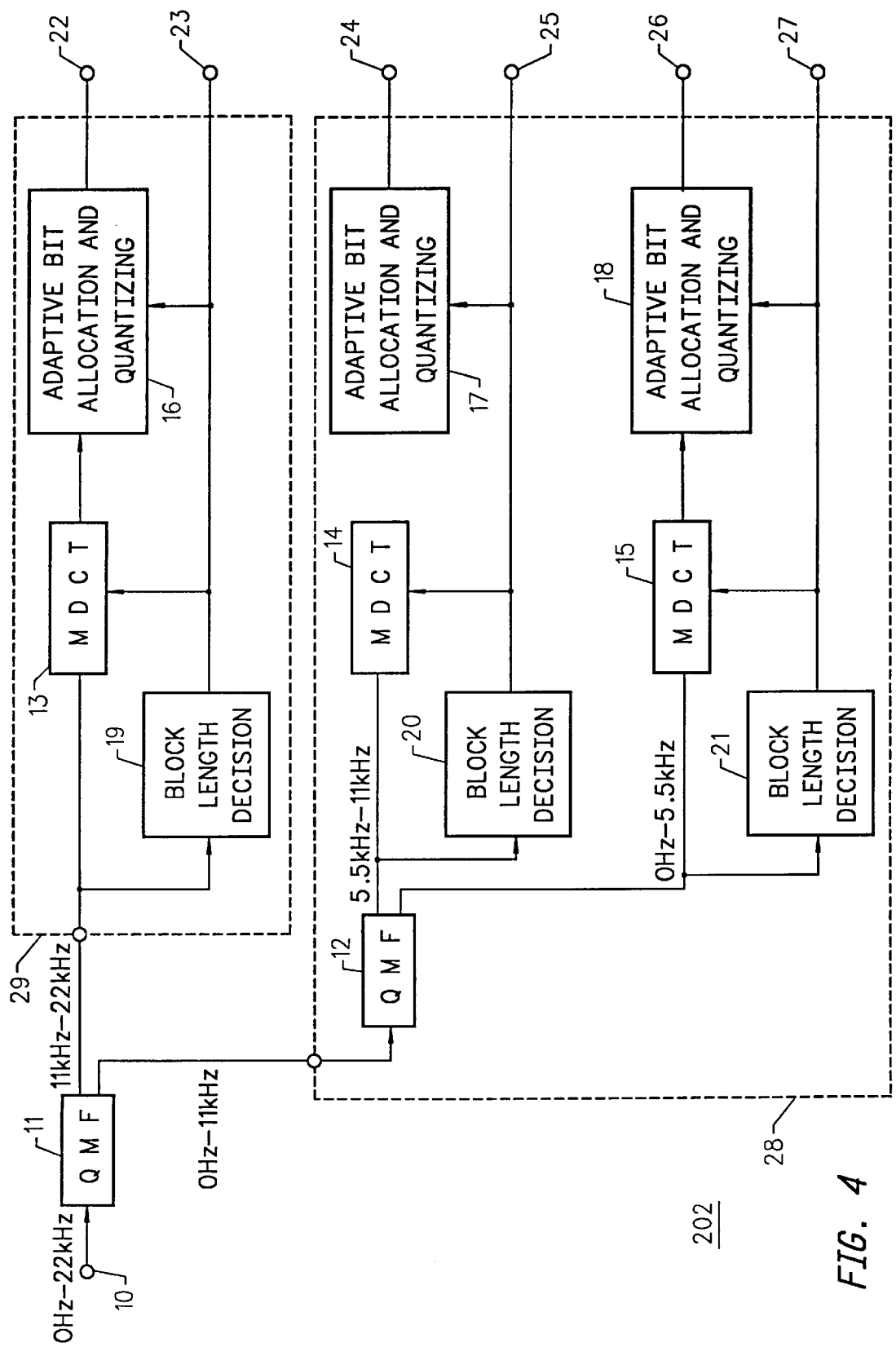
FIG. 4 is a block diagram showing a practical example of one of the compressors used in the first-stage compression system of the apparatus shown in FIG. 1.

The practical construction of the compressors $202_1$ to $202_n$ in the first-stage compression system 1 shown in FIG. 1 will now be described with reference to FIG. 4. In the compressors $202_1$ to $202_n$ shown in FIG. 1, the digital sound signal, which may be, for example, a PCM audio signal, in each channel is compressed using sub-band coding (SBC), adaptive transform coding (ATC), and adaptive bit allocation (APC-AB). FIG. 4 shows the arrangement of the compressor $202_1$ in the channel $CH_1$. The arrangement of the compressors $202_2$ to $202_n$ is similar except, since the high-frequency range signals above 11 kHz of the channels $CH_2$ to $CH_n$ are extracted by the coupling circuit 220 (FIG. 1), these compressors lack the frequency range dividing filter 11 and the high-frequency range processing circuit 29. Moreover, the compressor $202_1$ lacks the frequency range filter 11, since the function of this filter is provided by the filters in the coupling circuit 202. The arrangement of the compressors is disclosed in more detail in U.S. Pat. No. 5,301,205 owned by one of the present assignees (Sony Corporation).

In the present embodiment, the digital sound signal in the channel $CH_1$ is divided in frequency into plural frequency ranges by a non block-forming frequency range dividing filter. The frequency range signal in each frequency range from the frequency range dividing filter is dynamically divided in time into blocks, and each block of each frequency range is orthogonally transformed from the time domain to generate a set of spectral coefficients in the frequency domain. Quantizing bits are adaptively allocated to the spectral coefficients divided by frequency into bands, preferably critical bands, or into sub-bands obtained by dividing the higher-frequency bands in frequency. This enables the psychoacoustic characteristics of the human sense of hearing to be taken into account.

The non block-forming frequency division of the digital sound signal by the frequency range dividing filter may result in frequency ranges of equal width, but the width of the frequency ranges preferably increases with increasing frequency. The block length of the blocks into which the frequency range signals are divided in time is adaptively changed in response to the dynamic characteristics of the digital sound signal, or the frequency range signals, prior to the orthogonal transform. Block floating is applied to the spectral coefficients in each critical bands or in each of the sub-bands obtained by dividing the higher-frequency critical bands by frequency.

A critical band is a frequency band produced by a frequency division system that takes account of the frequency discrimination characteristics of the human sense of hearing. A critical band is a band of noise that can be masked by a pure sound having the same intensity as the band of noise, and a frequency in the middle of the band of noise. The width of the critical bands increases with increasing frequency. The audio frequency range of 0 Hz to 20 or 22 kHz is normally divided into 25 critical bands.

Where reference is made herein to critical bands, it is to be understood that the higher-frequency critical bands may optionally be divided in frequency into plural sub-bands. When the higher-frequency critical bands are divided into sub-bands, the reference to critical bands also applies to the sub-bands into which the higher-frequency critical bands have been divided.

In FIG. 4, the digital sound signal in the channel $CH_1$, which is, for example, a PCM audio signal in the frequency range of 0 Hz to 22 kHz, is supplied to the input terminal 10. The digital sound signal is divided by the frequency range dividing filter 11, which is preferably a Quadrature Mirror (QMF) filter, into a frequency range signal in the lower frequency range of 0 Hz to 11 kHz and a high frequency range signal in the frequency range of 11 to 22 kHz. The lower frequency range signal in the frequency range of 0 Hz to 11 kHz is further divided by the frequency range dividing filter 12, which is also preferably a QMF filter, into a low frequency range signal in the frequency range of 0 Hz to 5.5 kHz and a middle frequency range signal in the frequency range of 5.5 to 11 kHz.

The high frequency range signal from the frequency range dividing filter 11 is fed into the orthogonal transform circuit 13, which is preferably a modified discrete cosine transform (MDCT) circuit, and the block size decision circuit 19. The middle frequency range signal from the frequency range dividing filter 12 is fed into the MDCT circuit 14, and the block size decision circuit 20. The low frequency range signal from the frequency range dividing filter 12 is fed into the MDCT circuit 14, and the block size decision circuit 21.

Figure 5A:
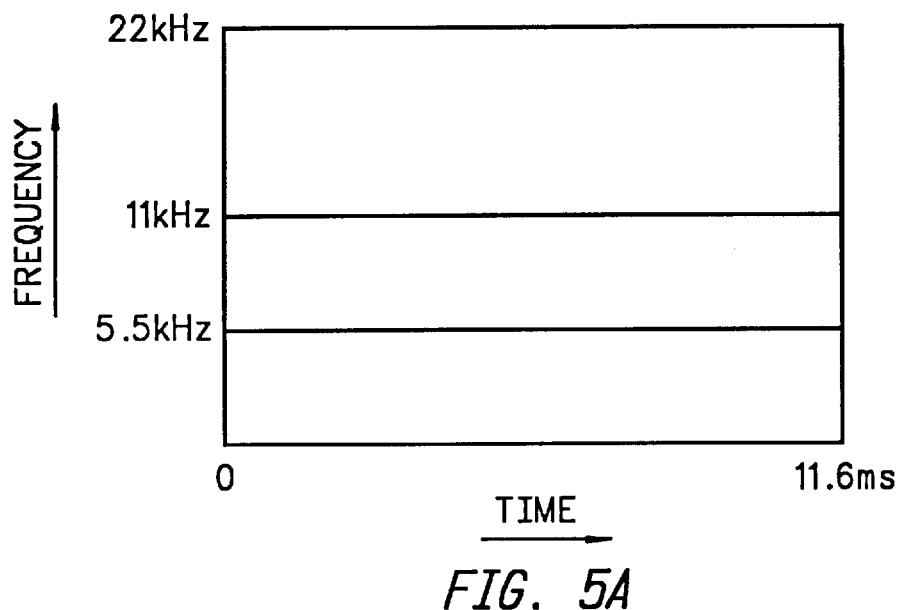
FIGS. 5A and 5B show how each frame of the digital sound signal is divided into frequency ranges, and the signal in each frequency range is divided in time into blocks in the compressor shown in FIG. 4.
Figure 5B:
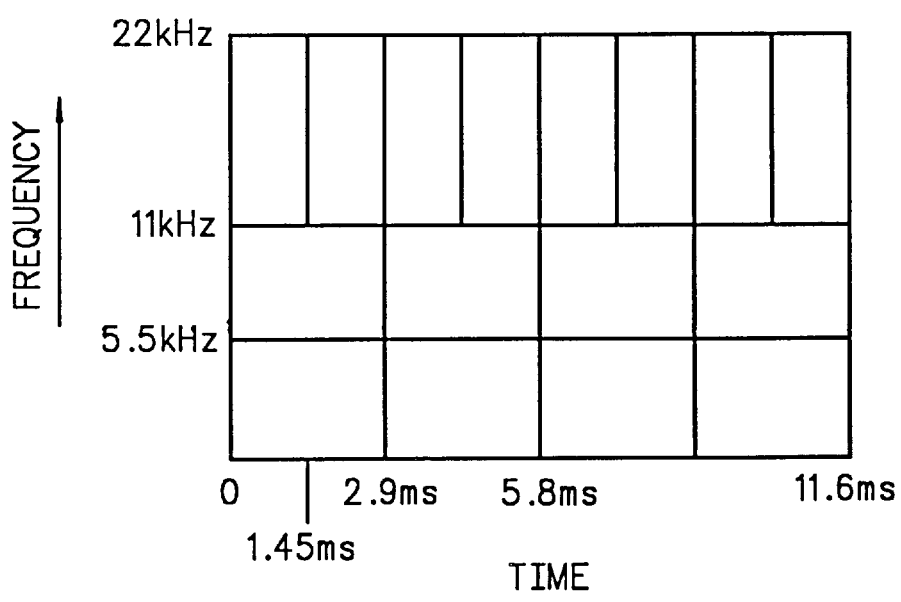

FIGS. 5A and 5B show practical examples of the blocks into which each frame of digital sound signal in the three frequency ranges is divided for orthogonally transforming by the MDCT circuits 13, 14 and 15. The block lengths of the blocks in the three frequency ranges are dynamically determined by the block length decision circuits 19, 20 and 21. FIGS. 5A and 5B respectively show the blocks of a long mode, in which the frequency range signals are orthogonally transformed in blocks having a longer block length, and of a short mode in which the frequency range signals are orthogonally transformed in blocks having a shorter block length. Additionally or alternatively, the frequency range signals may be orthogonally transformed in combinations of block lengths different from those shown.

In the practical examples shown in FIGS. 5A and 5B, the three frequency range signals each have two possible block lengths in which they are orthogonally transformed. The number of samples of the low frequency range signal in the frequency range of 0 Hz to 5.5 kHz and of the middle frequency signal in the middle frequency range of 5.5 kHz to 11 kHz in each block is set to 128 in the long mode shown in FIG. 5A, and is set to 32 in the short mode shown in FIG. 5B. On the other hand, the number of samples of the high frequency range signal in the frequency range of 11 kHz to 22 kHz in each block is set to 256 in the long mode shown in FIG. 5A, and to 32 in the short mode shown in FIG. 5B. In this manner, when the short mode is selected, the number of samples in the block subject to the orthogonal transform is set to be the same for all the frequency ranges. This decreases the frequency resolution with increasing frequency at the same time as the time resolution is increased as a result of dividing the frame into more blocks. The block length decision circuits 19, 20 and 21 respectively feed information indicating the block lengths determined thereby to the MDCT circuits 13, 14, and 15, to the adaptive bit allocation and quantizing circuits 16, 17 and 18, and to the output terminals 23, 25 and 27.

The adaptive bit allocation and quantizing circuits 16, 17, and 18 divide the spectral coefficients generated by the MDCT circuits 13, 14, and 15 by frequency into critical bands, and normalize and re-quantize the spectral coefficients in each critical band. To normalize the spectral coefficients in each critical band, the adaptive bit allocation and quantizing circuits 16, 17, and 18 determine a scale factor for each critical band, and respectively feed the scale factors to the output terminals 22, 24 and 26.

The number of bits with which adaptive bit allocation and quantizing circuits 16, 17, and 18 re-quantize the normalized spectral coefficients in each critical band depends on the block size information received from the respective block length decision circuit 19, 20, and 21, and the number of bits allocated for re-quantizing the spectral coefficients in the critical band. The adaptive bit allocation circuit that determines the allocation of quantizing bits among the critical bands will be described below.

The re-quantized spectral coefficients from the adaptive bit allocation and quantizing circuits 16, 17, and 18 are respectively fed to the output terminals 22, 24, and 26. Finally, the adaptive bit allocation and quantizing circuits 16, 17, and 18 respectively feed word length information, indicating the number of bits used to re-quantize the spectral coefficients in each critical band, to the output terminals 22, 24 and 26.

In determining the allocation of quantizing bits among the critical bands, the signal energy in each critical band is determined by calculating the root mean square values of the amplitudes of the spectral coefficients generated by the MDCT circuits 13, 14, and 15 in each critical band as the magnitude of the band. Alternatively, the scale factor for each critical band may be employed as the magnitude of the critical band, in which case, further calculations of the signal energy in each critical band are not required, and hence the scale of the hardware may be correspondingly reduced. The peak or mean values of the amplitudes of the spectral coefficients in each critical band may be employed as the magnitude of the critical band instead of the energy of the spectral coefficients.

In the example shown in FIG. 4, the bandwidth of the digital sound signal is set to 0 Hz to 22 kHz so that a general-purpose LSI handling this standard frequency range can be used. However, if the coupling circuit 220 (FIG. 1) is included in the multi-channel signal compressor, the circuit may be simplified because the digital sound signals in the channels $CH_2$ to $CH_n$, from which the high-frequency range signals above 11 kHz are removed by the coupling circuit 220, can be processed using only the low-frequency range compressor circuit 28. Thus, when the digital sound signals in eight channels are processed by the coupling circuit 220, eight low-frequency range compressor circuits 28 are required, one for each channel, and only one high-frequency range compressor circuit 29 is required for all the channels. Thus, only the channel CH1 requires the high-frequency range compressor circuit 29 to compress the combined high-frequency range signal generated by the coupling circuit 220. The QMF 11 would not be required in any of the compressor circuits, because filtering is performed by the coupling circuit. Although the combined high-frequency range signal is described above as being compressed by the compressor $202_1$, it may alternatively be compressed by any of the other compressors.

Figure 6:
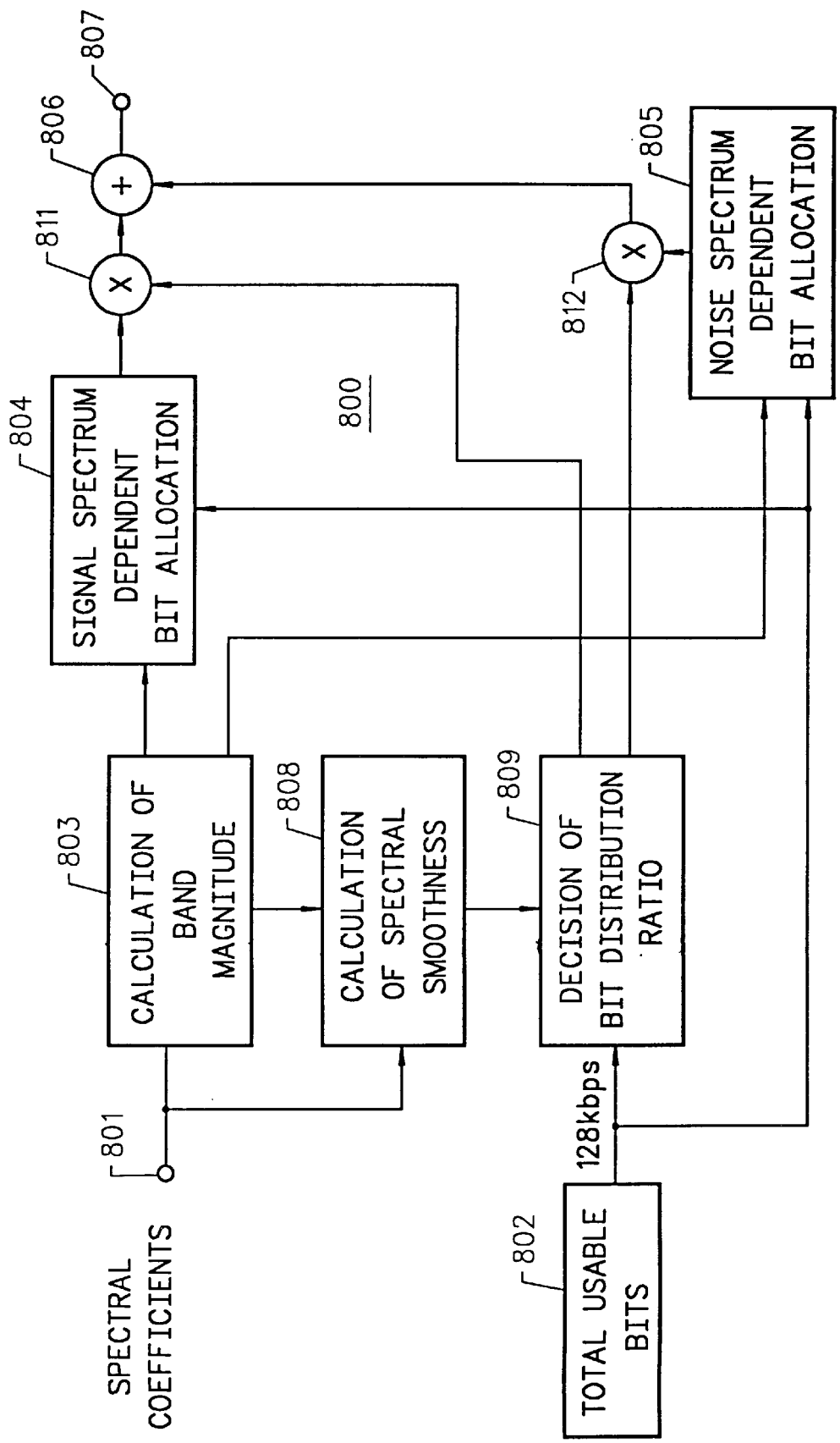
FIG. 6 is a block diagram of the adaptive bit allocation circuit for implementing a bit allocation technique employing both a signal spectrum-dependent bit allocation and a noise spectrum-dependent bit allocation.

FIG. 6 shows details of the adaptive bit allocation circuit 800 of the adaptive bit allocation and quantizing circuits 16, 17, and 18 (FIG. 4). The adaptive bit allocation circuit 800 determines the allocation of quantizing bits for re-quantizing the spectral coefficients in each critical band. In FIG. 6, the spectral coefficients from the MDCT circuits 13, 14, and 15 (FIG. 4) are fed into the band magnitude calculating circuit 803 via the input terminal 801 of the adaptive bit allocation and quantizing circuit 800. The band magnitude calculating circuit calculates a magnitude for each critical band from the set of spectral coefficients in the critical band resulting from orthogonally transforming each block of the frequency range signals. The band magnitude of the critical band is calculated by calculating the root mean square values of the amplitudes of the spectral coefficients in the critical band. The band magnitude may alternatively be derived from the peak or mean values of the amplitudes of the spectral coefficients in the critical band, the scale factor resulting from normalizing the spectral coefficients in the critical band, or in some other way.

Figure 8:
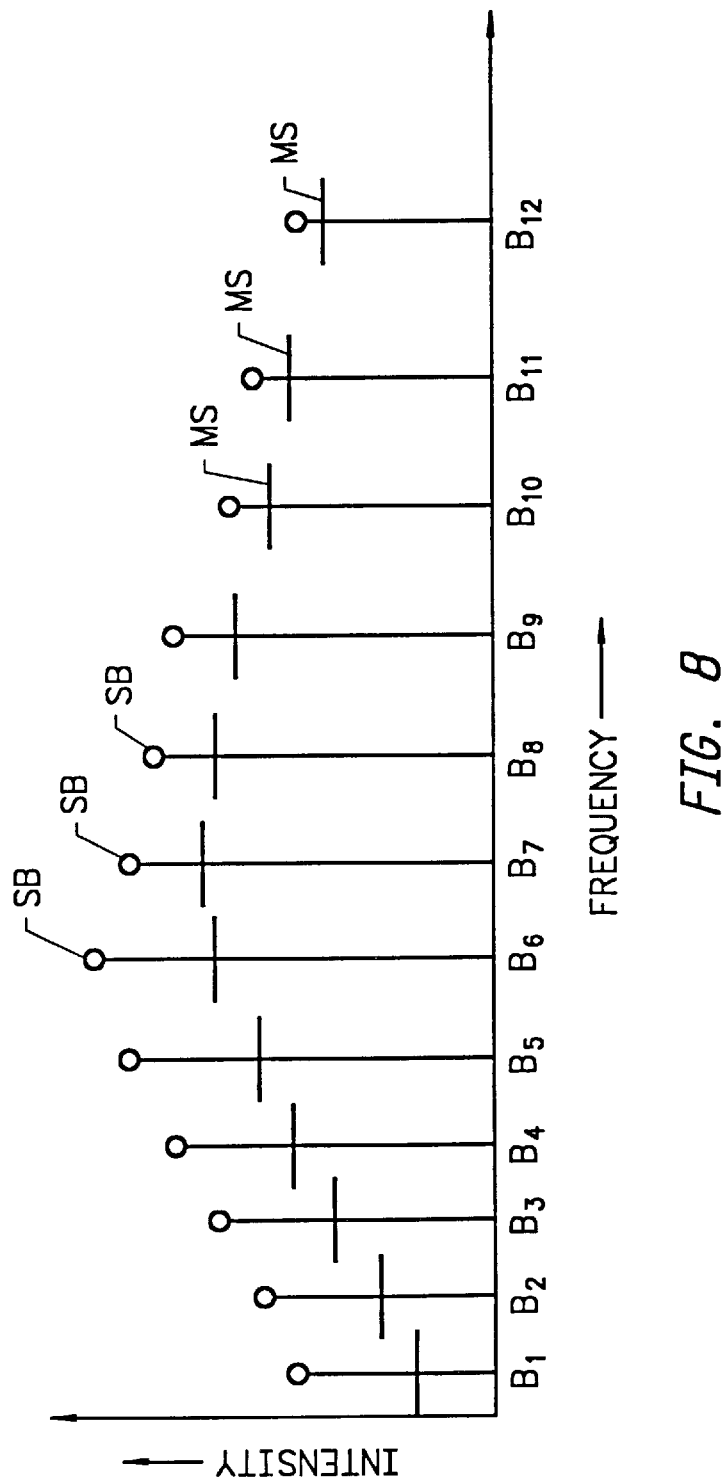
FIG. 8 is shows an example of masking by the spectral coefficients in each frequency band.

The band magnitude calculating circuit 803 provides as its output a band magnitude for each critical band, as shown in FIG. 8. For simplicity, FIG. 8 shows only 12 bands (B1 to B12) to represent the critical bands and the sub-bands into which the higher-frequency critical bands may be divided.

The band magnitudes calculated by the band magnitude calculating circuit 803 are supplied to the signal spectrum-dependent bit allocation circuit 804. The signal spectrum-dependent bit allocation circuit allocates a fixed number of quantizing bits corresponding to the bit rate indicated by block 802 among the critical bands in response to the logarithm of the magnitude of each critical band in a way that results in quantizing noise with a white noise spectrum.

The noise spectrum-dependent bit allocation circuit 805 performs bit allocation according to an allowable noise spectrum to distribute a fixed number of quantizing bits corresponding to the bit rate indicated by block 802 among the critical bands. The noise spectrum-dependent bit allocation circuit 805 receives the band magnitude for each critical band from the band magnitude calculating circuit 803. In response to the spectrum of the band magnitudes, the noise spectrum-dependent bit allocation circuit determines an allowable noise spectrum, i.e., an allowable noise level for each critical band, taking account of masking. Then, noise spectrum-dependent bit allocation circuit allocates the fixed number of bits corresponding to the bit rate among the critical bands to produce the required allowable noise spectrum.

The bit distribution ratio decision circuit 809 distributes the total available number of quantizing bits indicated by the block 802, for example, bits corresponding to a bit rate of 128 kbps, between the signal spectrum-dependent bit allocation and the noise spectrum-dependent bits allocation. The bit distribution ratio decision circuit 809 determines the distribution ratio between the two different types of bit allocation depending on the tonality of the sound signal of the channel, that is, the smoothness of the spectrum of the sound signal. The smoothness of the spectrum of the sound signal is indicated by a spectral smoothness index calculated by the spectral smoothness calculating circuit 808, and fed to the bit distribution ratio decision circuit.

The bit distribution decision circuit generates two control signals respectively indicating the bit distribution ratio and the complement of the bit distribution ratio, and respectively feeds them to the multipliers 811 and 812. The multiplier 811 multiplies the allocation of the fixed number of bits made by the signal spectrum-dependent bit allocation circuit 804 by the bit distribution ratio. The multiplier 812 multiplies the allocation the fixed number of bits made by the noise spectrum-dependent bits allocation circuit 805 by the complement of the bit distribution ratio.

The adder 806 sums the number of signal spectrum-dependent bits for each critical band determined by the multiplier 811, and the number of noise spectrum-dependent bits for each critical band determined by the multiplier 812 to give a total number of quantizing bits for quantizing the spectral coefficients in the critical band, and feeds the result to the output terminal 807. This way, the ratio between the number of signal spectrum-dependent bits and the number of noise spectrum-dependent bits actually used to re-quantize the spectral coefficients in each critical band is varied depending on the spectral smoothness of the sound signal in the channel. In response to the result received from the output terminal 807, the quantizers (not shown) in the adaptive bit allocation and quantizing circuits 16, 17, and 18 (FIG. 4) re-quantize each spectral coefficient in each critical band using the total number of quantizing bits allocated for quantizing the spectral coefficients in the critical band.

The noise spectrum-dependent bit allocating circuit 805 includes an allowable noise spectrum calculating circuit which takes account of masking by the sound signal in the band to calculate the allowable noise spectrum. Masking refers to the phenomenon by which a sound is rendered inaudible to the human sense of hearing when it is masked by another sound. Masking includes temporal masking by a sound in the time domain, and simultaneous masking by a sound in the frequency domain. As a result of masking, any noise that is subject to temporal or simultaneous masking will not be heard. Consequently, noise within the temporal or simultaneous masking range of the digital sound signal of the channel is regarded as allowable noise.

Figure 7:
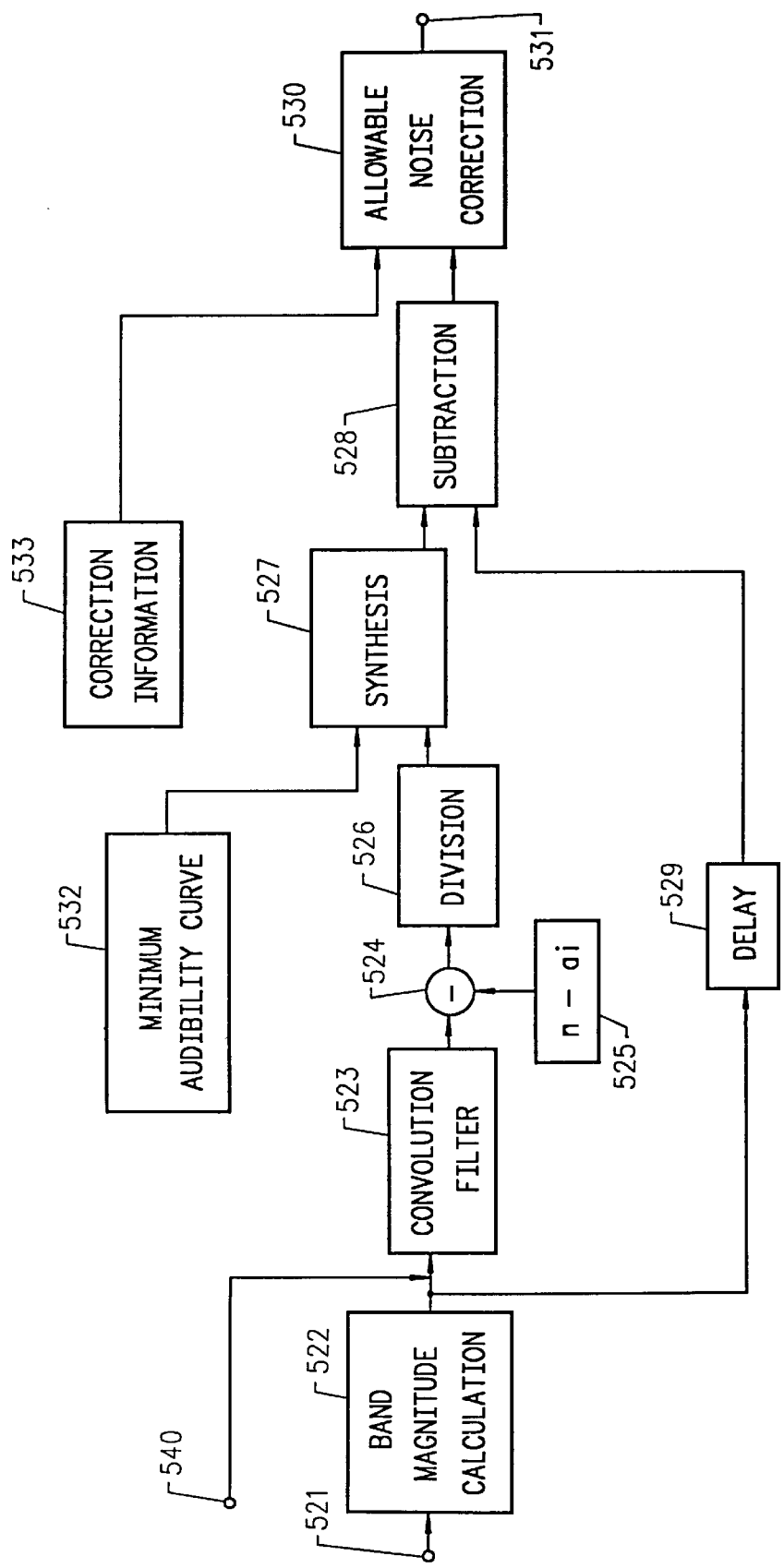
FIG. 7 is a block diagram of the allowable noise level detection circuit for finding the allowable noise level in the spectrum-dependent bit allocation circuit shown in FIG. 6.

A block diagram of a practical example of the allowable noise spectrum calculating circuit 805 is shown in FIG. 7. In FIG. 7, the spectral coefficients from the MDCT circuits 13, 14, and 15 are fed into the input terminal 521, whence they pass to the band magnitude calculating circuit 522. The band magnitude calculating circuit determines the magnitude of each critical band by calculating the sum of the amplitudes of the spectral coefficients in the critical band. Alternatively, the peak, RMS, or mean values of the amplitudes of the spectral coefficients in the critical band, or the scaling factor of the critical band, may be used. The spectrum of the magnitudes of the critical bands calculated by the band magnitude calculating circuit 522 is generally called a bark spectrum. FIG. 8 shows a typical bark spectrum SB, but only 12 critical bands B1 to B12 are shown to simplify the drawing.

To determine the masking effect of a bark spectrum, the bark spectrum SB is subject to convolution processing, i.e., the values of the bark spectrum are multiplied by a predetermined weighting function, and the resulting products are summed together. To this end, the values of the bark spectrum from the band magnitude calculating circuit 522 are fed into to the convolution filter 523. Alternatively, the band magnitudes calculated by the band magnitude calculating circuit 803 shown in FIG. 6 may be received via the terminal 540 and used as the bark spectrum. If this is done, the band magnitude calculating circuit 522 may be omitted.

The convolution filter 523 consists of plural delay elements that sequentially delay the values of the bark spectrum, plural multipliers, such as 25 multipliers, one for each critical band, for multiplying the output of each delay element by a weighting function, and a summing circuit for summing the multiplier outputs. The convolution processing just described derives the masking spectrum MS shown in FIG. 8 from the bark spectrum, also shown in FIG. 8.

Practical examples of the weighting function used in the convolution filter circuit 523 are 0.15, 0.0019, 0.0000086, 0.4, 0.06 and 0.007 in the multipliers M−1, M−2, M−3, M+1, M+2 and M+3, respectively. The weighting factor for the multiplier M is unity, and M is an arbitrary integer of from 1 to 25.

The output of the convolution filter 523 is fed into the subtractor 524 to find the level α corresponding to the allowable noise level in the convoluted region in each critical band. The level α corresponding to the allowable noise level in the convoluted region is the level that, after deconvolution, will give the allowable noise level for each critical band.

An allowed function, which represents the masking level, is supplied to the subtractor 524 for finding the level α. The level α is controlled by increasing or decreasing the allowed function. The allowed function is supplied by the (n−ai) function generator 525, which will be described below.

When the number of a critical band is i, the number of the lowest-frequency critical band being 1, the level α corresponding to the allowed noise level is determined by the following equation:

$$\alpha = S - (n - ai) \qquad (1)$$

where n and a are respectively constants (a>0), and S is intensity of the convolution-processed bark spectrum. In equation (1), (n−ai) represents the allowed function. In the preferred embodiment, n is set to 38 and a is set to −0.5. With these settings, there is no deterioration of the sound quality when the compressed signal is expanded, and a satisfactory compressed signal is therefore obtained.

The level α, determined as just described, is fed into the divider 526, which applies deconvolution to the level α in the convoluted region. This way, the masking spectrum becomes the allowable noise spectrum. Although the deconvolution normally requires a complicated arithmetic operation, the simple divider 526 is employed in the present embodiment to provide deconvolution.

Figure 9:
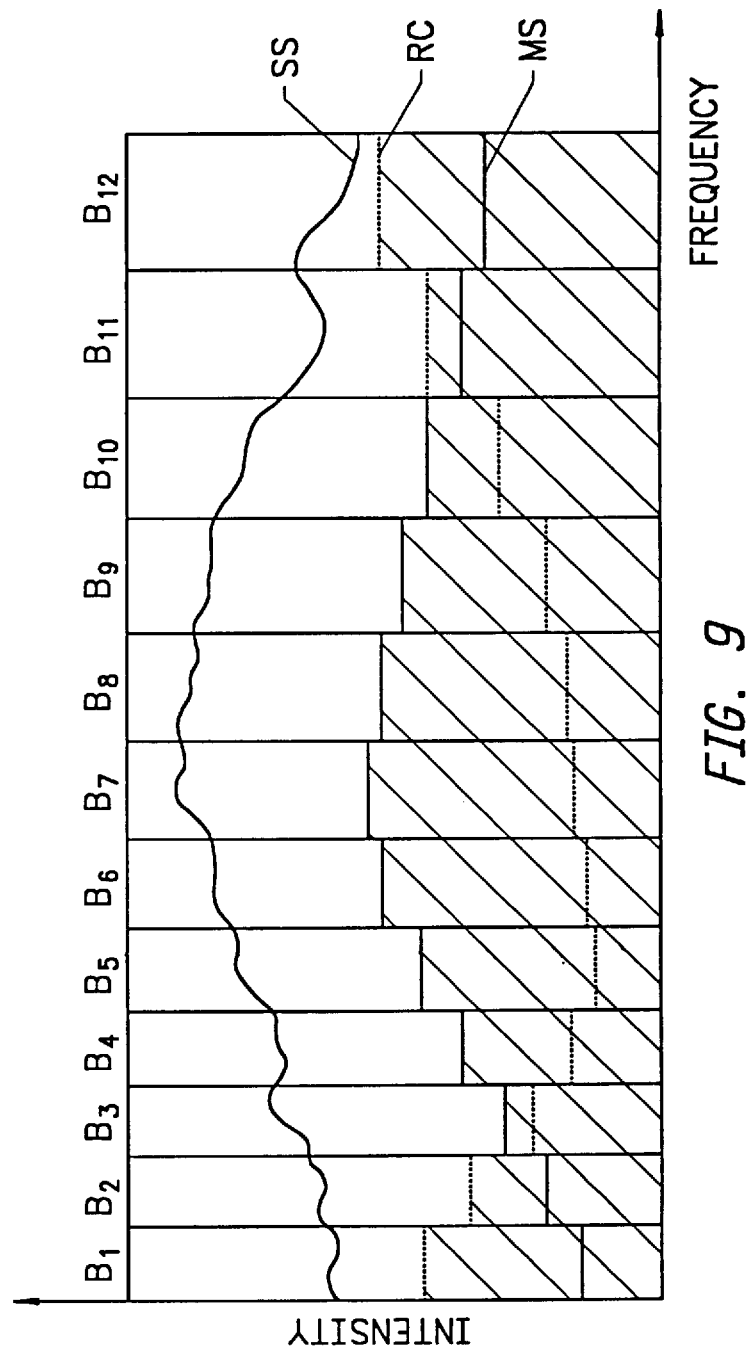
FIG. 9 is a chart showing the signal spectrum, the masking threshold, and the minimum audible level curve.

The masking spectrum, i.e., the masking level for each critical band is fed via the synthesis circuit 527 to the subtractor 528, which also receives the above-mentioned bark spectrum SB from the band magnitude calculating circuit 522, or from the band magnitude calculating circuit 803 (FIG. 6), via the delay circuit 529. The subtractor 528 subtracts the masking spectrum from the bark spectrum SB so that the portion of the bark spectrum SB below the masking level MS is masked, as shown in FIG. 9. The delay circuit 529 delays the bark spectrum SB to take account of processing delay in the circuits preceding the subtractor 528.

The output of the subtractor 528 is fed to the output terminal 531 via the allowable noise spectrum correction circuit 530. The output from the output terminal 531 is fed to a ROM (not shown), in which plural sets of allocated bit numbers are stored. The output from the output terminal 531 selects from the ROM a set of allocated bit numbers, i.e., an allocated bit number for each critical band. The ROM feeds the set of allocated bit numbers to an output terminal as the output of the noise spectrum-dependent bit allocation circuit 805 shown in FIG. 6.

The synthesis circuit 527 synthesizes data indicating the so-called minimum audible level curve RC with the masking spectrum MS, as shown in FIG. 9. The minimum audible level curve represents another of the characteristics of the human sense of hearing, and is supplied by the minimum audible level curve generator 523. Noise with an absolute level below the minimum audible level curve cannot be heard. For a given quantization, the shape of the minimum audible curve depends on the playback volume. However, since the manner in which a digital sound signal is accommodated by the dynamic range of practical 16-bit digital systems does not vary significantly, if quantizing noise is inaudible in the frequency band to which the ear is most sensitive, i.e., the frequency band in the vicinity of 4 kHz, it can be assumed that quantizing noise below the level of the minimum audible level curve will not be heard in other frequency bands. Accordingly, when the quantizing noise level in the vicinity of 4 kHz corresponding to the word length set by the system is not heard, the allowed noise level can be provided by synthesizing the minimum audible level curve RC and the masking spectrum MS. The resulting allowed noise level in each critical band may be up to the level indicated by the cross-hatched portion in FIG. 9. In this embodiment, the level of the minimum audible level curve at 4 kHz is set to correspond to the minimum level corresponding to quantizing using, e.g., 20 bits. FIG. 9 also shows the signal spectrum SS.

The allowable noise spectrum correction circuit 530 corrects the allowable noise spectrum at the output of the subtractor 528 on the basis of, e.g., an equal-loudness curve, generated by the correction information circuit 533. The equal-loudness curve is yet another characteristic of the human sense of hearing. This curve is derived by determining the sound pressure levels at various frequencies that can be heard at the same intensity as that of a pure sound at 1 kHz. The equal-loudness curve is substantially similar to the minimum audible curve RC shown in FIG. 9. According to the equal-loudness curve, a sound in the vicinity of 4 kHz is heard with the same intensity as that of a sound at 1 kHz when the sound pressure level of the 4 kHz sound is 8 to 10 dB less than that of the 1 kHz sound. On the other hand, a sound in the vicinity of 50 Hz must have a sound pressure level of about 15 dB greater than the sound pressure level of a 1 kHz sound to be heard at the same intensity. For this reason, noise above the level of the minimum audible level curve should have a frequency characteristic given by a curve corresponding to the equal-loudness curve. It can be seen that adapting the system to the characteristics of the human sense of hearing requires that the allowed noise spectrum be corrected to take account of the equal-loudness curve.

Returning now to FIG. 6, the distribution ratio of the total available number of bits for the channel between the two bit allocation techniques, i.e., noise spectrum-dependent bit allocation and signal spectrum-dependent bit allocation, is set by bit distribution ratio decision circuit 809 in response to the spectral smoothness index calculated by the spectral smoothness calculating circuit 808. The spectral smoothness index indicates the smoothness of the spectrum of the digital sound signal of the channel. The practical method of distributing the total available number of bits between the two bit allocation techniques will now be described.

The spectral coefficients from the MDCT circuits 13, 14, and 15 (FIG. 1) are fed via the input terminal 801 to the spectral smoothness calculating circuit 808, which is also supplied with the output from the band magnitude calculating circuit 803. The spectral smoothness calculating circuit 808 calculates an index indicating the smoothness of the spectrum of the digital sound signal. In the present embodiment, the sum of absolute values of the differences between adjacent values of the signal spectrum, divided by the sum of the absolute values of the signal spectrum, is used as the index. For example, the spectral smoothness calculating circuit can calculate the quotient of the sum of absolute values of the differences between the values of adjacent band magnitudes and the sum of all the band magnitudes as the spectral smoothness index, i.e., $$i = 0.5 \times \frac{\sum_{i=1}^{n} |S_i - S_{i-1}|}{\sum_{i=1}^{n} |S_i|}$$

where I is the spectral smoothness index, and $S_i$ is the band magnitude in the i'th critical band.

The spectral smoothness index is fed from the spectral smoothness calculating circuit 808 to the bit distribution ratio decision circuit 809 which sets the distribution ratio between the bits allocated according to the signal spectrum-dependent bit allocation and the bits allocated according to the noise spectrum-dependent bit allocation. The bit distribution ratio decision circuit 809 receives information indicating the total available number of bits from the block 802. The bit distribution ratio decision circuit sets the bit distribution ratio so that, as the spectral smoothness index from the spectral smoothness calculating circuit 808 increases, indicating that the smoothness of the spectrum of the digital sound signal is reduced, more bits are allocated by the noise spectrum-dependent bit allocation, and fewer bits are allocated by the signal spectrum-dependent bit allocation.

The bit distribution ratio decision circuit 809 feeds a control signal indicating the bit distribution ratio to the multiplier 811, and feeds a control signal representing the complement of the bit distribution ratio (1 minus the distribution ratio) to the multiplier 812. The multiplier 811 adjusts the signal spectrum-dependent bit allocation and the multiplier 812 adjusts the noise spectrum-dependent bit allocation according to the distribution ratio.

When the spectrum of the digital sound signal is smooth, the control signal representing the bit distribution ratio from the bit distribution ratio decision circuit 809 assumes a value of 0.8 to allocate more bits by the signal spectrum-dependent bit allocation. The control signal representing the complement of the bit distribution ratio fed to the multiplier 812 is set to 1−0.8=0.2. The multiplier 811 multiplies the bit allocation information from the signal spectrum-dependent bit allocation circuit 804 by 0.8, while the multiplier 812 multiplies the bit allocation information from the noise spectrum-dependent bit allocation circuit 805 by 0.2. The outputs of the multipliers 811 and 812 are summed by the adder 806 to provide the total bit allocation for each critical band. The total bit allocations are fed to the output terminal 807.

Figure 10:
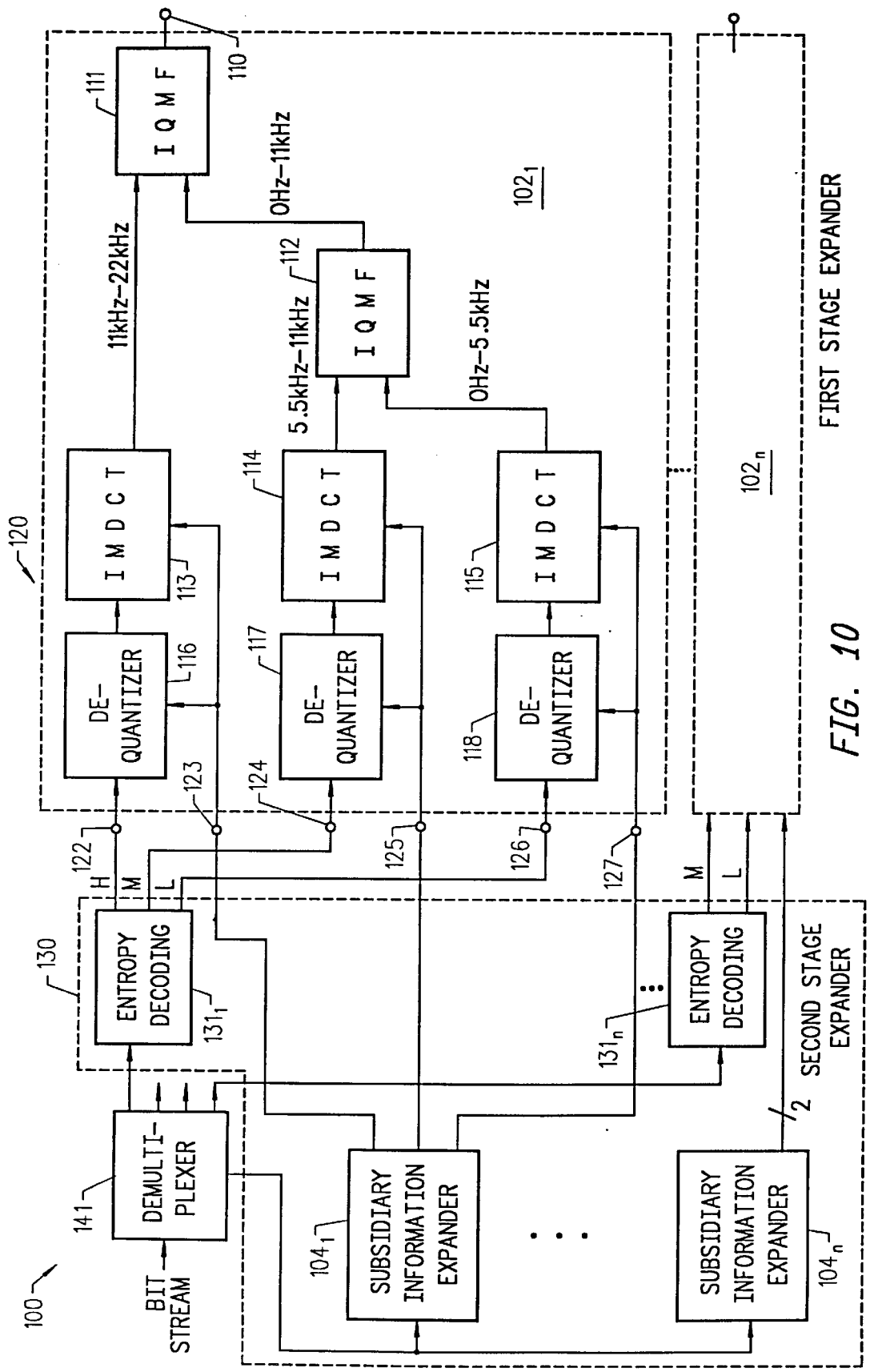
FIG. 10 is a block circuit diagram showing an example of a multi-channel expander according to the invention for expanding the compressed multi-channel sound signal generated by the multi-channel compressor shown in FIG. 1.

FIG. 10 shows an arrangement of the multi-channel expander 100 which is the counterpart of the multi-channel compressor 200 shown in FIG. 1. In FIG. 10, the bitstream reproduced from the recording medium (or received following transmission) is fed to the demultiplexer 141 following error correction. The demultiplexer 141 separates the error-corrected bitstream into the entropy-coded main information and the compressed subsidiary information for each channel. The demultiplexer feeds the entropy-coded main information to the second-stage expander 130, and feeds the compressed subsidiary information to the subsidiary information expanders $104_1$ to $104_n$.

In the second-stage expander 130, the entropy decoders $131_1$ to $131_n$ decode the entropy-coded main information for their respective channels to generate a set of quantized spectral coefficients for each of the frequency ranges in each channel. Each set of quantized spectral coefficients consists of fixed-length words, i.e., the spectral coefficients in each critical band are quantized using the same number of bits. Because of the coupling processing applied to the original digital sound signals, only the entropy decoder $131_1$ for the channel $CH_1$ generates a set of quantized spectral coefficients in each of three frequency ranges. The entropy decoders $131_2$ to $131_n$ of the channels $CH_2$ to $CH_n$ each generate a set of quantized spectral coefficients for only the low and middle frequency ranges.

The subsidiary information expanders $104_1$ to $104_n$ expand the compressed subsidiary information for each channel received from the multiplexer 141, and feed the resulting subsidiary information for each of the frequency ranges of each channel to the respective one of the expanders $102_1$ to $102_n$ in the first stage expander 120. For example, the subsidiary information expander $104_1$ feeds the subsidiary information for the three frequency ranges of the channel $CH_1$ to the input terminals 123, 125, and 127 of the expander $102_1$ of the channel $CH_1$. Again, because of the coupling processing applied to the original digital signals, the subsidiary information decoders $104_2$ to $104_n$ for the channels $CH_2$ to $CH_n$ only supply the subsidiary information for the low and middle frequency ranges to the respective expanders $102_2$ to $102_n$.

The second-stage expander 130 feeds the set of quantized spectral coefficients for each of the frequency ranges of each channel to the input terminals of the first stage expander 120. For example, the entropy decoder $131_1$ of the channel $CH_1$ feeds the set of quantized spectral coefficients for each of the three frequency ranges of the channel $CH_1$ to the terminals 122, 124, and 126 of the expander $102_1$ in the first-stage expander 120.

The expander $102_1$ of the channel $CH_1$ in the first stage expander 120 will be described next. The expanders $102_2$ to $102_n$ of the channels $CH_1$ to $CH_n$ are similar, except that they lack the high-frequency range dequantizer 116 and the inverse MDCT circuit 113, and may lack the inverse quadrature mirror circuit 111.

The dequantizing circuits 116, 117 and 118 release the adaptive bit allocation applied to set of quantized spectral coefficients in the respective frequency range the using the respective word length information. The resulting uniformly-quantized spectral coefficients in each frequency range are fed to the respective one of the inverse orthogonal transform circuits 113, 114, and 115.

The inverse orthogonal transform circuits IMDCT circuits 113, 114 and 115, which are preferably inverse MDCT circuits, inversely orthogonally transform the set of uniformly-quantized spectral coefficients in the respective frequency range to generate a block of a time domain signal in the respective frequency range. In the course of performing the inverse MDCT, the block floating applied to the spectral coefficients is released. The time-domain signals in the respective frequency ranges are combined by the inverse quadrature mirror filter (IQMF) circuits 112 and 111 into a full frequency-range digital sound signal, which is fed to the output terminal 110.

If coupling is not applied to the digital sound signals fed to the first-stage compression system 1 in the multi-channel signal compressor shown in FIG. 1, the expanders $102_2$ to $102_n$ must also each include the dequantizer 116, the IMDCT circuit 113, and the IQMF 111 to process the high-frequency range of each channel.

If coupling is applied to the digital sound signals, it is preferable that the center channel be handled by the channel $CH_1$ so that the high-frequency range signal is reproduced by the center loudspeaker. Alternatively, the IQMF 111 may be included in more channels than the channel CH1. In a channel in which the IQMF 111 were included, the IQMF 111 would be used to synthesize the combined high-frequency range time domain signal from the output of the IMDCT 113 in the channel $CH_1$ with the lower-frequency time domain signal of the channel from the output of the IQMF 112 of the channel. This way, the combined high-frequency range signal would be reproduced from more than one of the loudspeakers.

The above description has been made with reference to an eight-channel sound system. However, the apparatus described herein is modular and can be used to process the sound signals in a multi-channel sound system having any number of channels greater than two.

Although illustrative embodiments of the invention have been described herein in detail, it is to be understood that the invention is not limited to the precise embodiments described, and that various modifications may be practiced within the scope of the invention defined by the appended claims.

We claim:

1. A multi-channel signal compressor for compressing digital sound signals in respective channels of a multi-channel sound system, the apparatus comprising:

first-stage compression system, including:

coupling means for performing coupling between the digital sound signals of at least two of the channels to generate coupling-processed signals, one for each of the channels, and compressor means, receiving the coupling-processed signals from the coupling means, for:

frequency dividing each of the coupling-processed signals into frequency range signals in respective frequency ranges; and compressing the frequency range signals obtained by dividing each of the coupling processed signals to generate a first-stage compressed signal; and second-stage compression system, including:

determining means, receiving from the first-stage compression system in the first-stage compressed signal for each of the channels, for determining from the first-stage compressed signal for each of the channels an energy for each of the channels, channel bit apportionment decision means, operating in response to the determining means, for apportioning a predetermined number of bits among the channels to apportion a number of bits to each of the channels, and additional compressor means for additionally compressing the first-stage compressed signal for each of the channels using, for each one of the channels, the number of bits apportioned to the one of the channels by the channel bit apportionment decision means.

2. The multi-channel signal compressor of claim 1, wherein the coupling means performs coupling between at least a high frequency range portion of the digital sound signals in the at least two channels.

3. The multi-channel signal compressor of claim 2, wherein:

the coupling means generates a coupling signal from the high frequency range portion of the digital sound signals in the at least two channels; and the compressor means compresses the coupling signal as a high frequency range portion of one of the coupling-processed signals.

4. The multi-channel signal compressor of claim 3, wherein:

at least one of the digital sound signals between which the coupling means performs coupling includes a lower frequency range portion not subject to coupling by the coupling means; and the compressor means compresses the lower frequency range portion of the at least one of the digital sound signals.

5. The multi-channel signal compressor of claim 2, wherein the high frequency range portion of the digital sound signals has a minimum frequency of at least 3 kHz.

6. The multi-channel signal compressor of claim 1, wherein:

the first-stage compressed signal includes fixed-length code words; and the additional compressor means includes variable-length encoding means for converting the fixed-length code words of the first-stage compressed signal into variable-length code such that more-frequently occurring fixed-length code words are converted to variable-length code words having a shorter word length.

7. A method for compressing digital sound signals in respective channels of a multi-channel sound system, the method comprising steps of:

performing coupling between the digital sound signals in at least two of the channels to generate coupling-processed signals, one for each of the channels;

frequency dividing the coupling-processed signals into frequency range signals in respective frequency ranges;

compressing the frequency range signals obtained by dividing each of the coupling-processed signals to generate a first-stage compressed signal;

determining an energy for each one of the channels from the first-stage compressed signal of the one of the channels;

apportioning, in response to the energy for each of the channels determined in the determining step, a predetermined number of bits among the channels to apportion a number of bits to each of the channels; and additionally compressing the first-stage compressed signal for each of the channels using, for each one of the channels, the number of bits apportioned by the apportioning step to the one of the channels.

8. The method of claim 7, wherein, in the step of performing coupling, coupling between at least a high frequency range portion of the digital sound signals in the at least two channels is performed.

9. The method of claim 8, wherein:

in the step of performing coupling, a coupling signal is generated by performing coupling between the high frequency range portions of the digital sound signals in the at least two channels; and the frequency dividing and compressing steps are applied to the coupling signal as a high frequency portion of one of the coupling-processed signals.

10. The method of claim 9, wherein, in the step of performing coupling, the high frequency range portion of the digital sound signals in the at least two channels has a minimum frequency of at least 3 kHz.

11. A method for transmitting digital sound signals in respective channels of a multi-channel sound system via a transmission medium, the method comprising steps of:

performing coupling between the digital sound signals in at least two of the channels to generate coupling-processed signals, one for each of the channels;

frequency dividing the coupling-processed signals into frequency range signals in respective frequency ranges;

compressing the frequency range signals obtained by dividing each of the coupling-processed signals to generate a first-stage compressed signal;

determining an energy for each one of the channels from the first-stage compressed signal of the one of the channels;

apportioning, in response to the energy for each of the channels determined by the determining step, a predetermined number of bits among the channels to apportion a number of bits to each of the channels;

additionally compressing the first-stage compressed signal for each of the channels to generate a second-stage compressed signal for each of the channels, the first-stage compressed signal for each of the channels being compressed using, for each one of the channels, the number of bits apportioned by the apportioning step to the one of the channels;

multiplexing the second-stage compressed signals of all of the channels to provide a bit stream; and applying the bit stream to the transmission medium.

12. A multi-channel signal expander for expanding a compressed signal representing digital sound signals in respective channels of a multi-channel sound system, the digital sound signals in at least two of the channels having been subject to coupling prior to compression, the compressed signal including main information and subsidiary information representing the digital sound signals of the at least two of the channels, the apparatus comprising:

demultiplexing means for demultiplexing the compressed signal to extract the main information and the subsidiary information;

second-stage expander means for expanding the main information from the demultiplexing means by converting variable-length codes to fixed-length codes; and first-stage expander means, operating in response to the subsidiary information from the demultiplexing means, for additionally expanding the fixed-length codes from the second-stage expander means to provide a reconstructed digital sound signal in each of the at least two channels; wherein:

ones of the fixed-length codes whereon the first-stage expander means operates in one of the at least two channels represent a narrower bandwidth than ones of the fixed-length codes whereon the first-stage expander means operates in another of the at least two channels, notwithstanding the digital sound signal in the one of the at least two channels and the digital sound signal in the other of the at least two channels having nominally the same bandwidth.

13. The multi-channel signal expander of claim 12, wherein:

the main information includes information relating to plural frequency ranges in each of the at least two channels;

the first-stage expander means includes:

means for reconstituting a time domain signal in each of the frequency ranges for each of the at least two channels, and means for synthesizing the time domain signals in the frequency ranges for each of the at least two channels to generate the reconstructed digital sound signal for each of the at least two channels.

14. A method for expanding a compressed signal representing digital sound signals in respective channels of a multi-channel sound system, the digital sound signals in at least two of the channels having been subject to coupling prior to compression, the compressed signal including main information and subsidiary information representing the digital sound signals of the at least two of the channels, the method comprising steps of:

demultiplexing the compressed signal to extract the main information and the subsidiary information;

expanding the main information extracted from the compressed signal in the demultiplexing step by converting variable-length codes of the main information to fixed-length codes; and using the subsidiary information extracted from the compressed signal in the demultiplexing step to further expand the fixed-length codes obtained by converting the variable-length codes of the main information to generate a reconstructed digital sound signal in each of the at least two channels; wherein:

ones the fixed-length codes whereon the step of further expanding operates in one of the at least two channels represent a narrower bandwidth than ones of the fixed-length codes whereon the step of further expanding operates in another of the at least two channels, notwithstanding the digital sound signal in the one of the at least two channels and the digital sound signal in the other of the at least two channels having nominally the same bandwidth.

15. The method of claim 14, wherein the main information includes information relating to plural frequency ranges of each of the at least two channels, and wherein:

the step of further expanding includes steps of:

processing ones of the fixed-length codes to reconstitute a time domain signal in each of the frequency ranges for each of the at least two channels, and synthesizing the time domain signals in the frequency ranges for each of the at least two channels to generate the reconstituted digital sound signal for each of the at least two channels.

16. A multi-channel signal compressor for compressing digital sound signals in respective channels of a multi-channel sound system, the apparatus comprising:

first-stage compressor means for receiving the digital sound signals of the respective channels and for compressing the digital sound signals to provide respective first-stage compressed signals; and second-stage compressor means for:

receiving the first-stage compressed signals from the first-stage compressor means, determining an energy for each of the channels from a respective one of the first-stage compressed signals, apportioning bits among the channels in response to the energy determined for each of the channels to apportion a number of bits to each one of the channels, and additionally compressing the first-stage compressed signals to provide respective second-stage compressed signals, the second-stage compressed signal in each one of the channels using the number of bits apportioned to the one of the channels.

\* \* \* \* \*

UNITED STATES PATENT AND TRADEMARK OFFICE
CERTIFICATE OF CORRECTION

PATENT NO. : 5,873,065
DATED : February 16, 1999
INVENTOR(S) : Kenzo Akagiri et al.

It is certified that error appears in the above-identified patent and that said Letters Patent is hereby corrected as shown below:

On the title page, item [73] Assignee, should read

Sony Corporation, Tokyo, Japan
Dolby Laboratories Licensing Corporation, San Francisco, California Signed and Sealed this Seventh Day of December, 1999

Attest:

Q. TODD DICKINSON

*Attesting Officer*      *Acting Commissioner of Patents and Trademarks*